United States Patent
Osumi et al.

(10) Patent No.: US 9,910,300 B2
(45) Date of Patent: Mar. 6, 2018

(54) VARIABLE OPTICAL ATTENUATOR AND OPTICAL MODULE

(71) Applicant: FUJITSU LIMITED, Kawasaki-shi, Kanagawa (JP)

(72) Inventors: Yuya Osumi, Kawasaki (JP); Jun Okabe, Kawasaki (JP); Miki Onaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/015,572

(22) Filed: Feb. 4, 2016

(65) Prior Publication Data

US 2016/0259185 A1 Sep. 8, 2016

(30) Foreign Application Priority Data

Mar. 3, 2015 (JP) ................................. 2015-041057

(51) Int. Cl.
| | |
|---|---|
| *H04B 10/08* | (2006.01) |
| *H04B 17/00* | (2015.01) |
| *G01J 3/28* | (2006.01) |
| *G02F 1/09* | (2006.01) |
| *G02B 26/00* | (2006.01) |
| *G02F 1/01* | (2006.01) |
| *H04B 10/079* | (2013.01) |
| *H04B 10/67* | (2013.01) |
| *G02F 1/21* | (2006.01) |

(52) U.S. Cl.
CPC .......... *G02F 1/0123* (2013.01); *G02F 1/0147* (2013.01); *G02F 1/21* (2013.01); *H04B 10/07955* (2013.01); *H04B 10/674* (2013.01); *G02F 2001/213* (2013.01)

(58) Field of Classification Search
USPC ....... 359/281, 291; 356/326, 352; 398/28, 38
See application file for complete search history.

(56) References Cited

U.S. PATENT DOCUMENTS 5,113,275 A * 5/1992 Patel ................. G02F 1/133382
349/116
5,283,845 A * 2/1994 Ip ........................... G02B 6/264
372/6

(Continued)

FOREIGN PATENT DOCUMENTS

JP 2008-244391 10/2008

*Primary Examiner* — David Payne
*Assistant Examiner* — Pranesh Barua
(74) *Attorney, Agent, or Firm* — Staas & Halsey LLP

(57) ABSTRACT

A variable optical attenuator includes: a transparent medium configured to transmit light; a first reflective film formed on a light incidence surface of the transparent medium; a second reflective film formed on a light emission surface of the transparent medium; and a resonance length variable medium configured to vary an optical resonance length between the first reflective film and the second reflective film, wherein the first reflective film has a first reflectivity at which at least one of light of a first wavelength and light of a second wavelength is partially transmitted through the first reflective film, the at least one of light being the light of the first wavelength, and wherein the second reflective film has a second reflectivity lower than the first reflectivity for the light of the first wavelength and a third reflectivity lower than the second reflectivity for the light of the second wavelength.

11 Claims, 22 Drawing Sheets

(56) References Cited

U.S. PATENT DOCUMENTS

| | | | | |
|---|---|---|---|---|
| 5,784,507 A * | 7/1998 | Holm-Kennedy | G01J 3/0259 | 250/227.23 |
| 5,982,488 A * | 11/1999 | Shirasaki | G02B 7/008 | 356/519 |
| 6,181,726 B1 * | 1/2001 | Lunt | G02B 5/20 | 372/19 |
| 6,441,944 B1 * | 8/2002 | Kim | G02F 1/09 | 359/238 |
| 6,621,614 B1 * | 9/2003 | Zhang | G02B 5/284 | 349/198 |
| 7,676,157 B2 * | 3/2010 | Strasser | G02B 6/29367 | 398/85 |
| 8,503,058 B2 * | 8/2013 | Wang | G02F 1/21 | 356/454 |
| 2002/0031324 A1 * | 3/2002 | Cao | G02B 6/352 | 385/140 |
| 2002/0090192 A1 * | 7/2002 | O'Brien | G02B 6/266 | 385/140 |
| 2002/0149850 A1 * | 10/2002 | Heffner | G02B 26/001 | 359/578 |
| 2003/0016707 A1 * | 1/2003 | McDonald | G02B 5/281 | 372/20 |
| 2003/0030908 A1 * | 2/2003 | Cheng | G02B 6/29358 | 359/577 |
| 2003/0161567 A1 * | 8/2003 | Baxter | G02B 6/29358 | 385/11 |
| 2004/0141710 A1 * | 7/2004 | Kishida | G02B 6/266 | 385/140 |
| 2005/0180748 A1 * | 8/2005 | Kawahata | H04B 10/071 | 398/16 |
| 2005/0201754 A1 * | 9/2005 | Fujita | H04J 14/0279 | 398/85 |
| 2005/0207007 A1 * | 9/2005 | Shimoda | G03B 21/602 | 359/449 |
| 2005/0270635 A1 * | 12/2005 | Shukunami | G02F 1/0123 | 359/337 |
| 2006/0280512 A1 * | 12/2006 | Sato | G02B 5/284 | 398/212 |
| 2007/0104488 A1 * | 5/2007 | Miyata | H04J 14/0206 | 398/83 |
| 2007/0236704 A1 * | 10/2007 | Carr | G01L 9/0079 | 356/519 |
| 2008/0106745 A1 * | 5/2008 | Haber | G01B 11/18 | 356/519 |
| 2008/0186503 A1 * | 8/2008 | Kiesel | G01N 21/031 | 356/454 |
| 2011/0292386 A1 * | 12/2011 | Funamoto | G01J 3/02 | 356/319 |
| 2012/0008141 A1 * | 1/2012 | Matsushita | G02B 5/284 | 356/326 |
| 2012/0013905 A1 * | 1/2012 | Nozawa | G01J 3/26 | 356/326 |
| 2012/0033295 A1 * | 2/2012 | Presi | H04B 10/2587 | 359/344 |
| 2012/0044491 A1 * | 2/2012 | Urushidani | G01J 3/0294 | 356/326 |
| 2012/0044492 A1 * | 2/2012 | Matsushita | G02B 26/001 | 356/326 |
| 2012/0075636 A1 * | 3/2012 | Zilkie | G02F 1/21 | 356/454 |
| 2013/0279006 A1 * | 10/2013 | Song | G02B 1/10 | 359/584 |
| 2013/0315527 A1 * | 11/2013 | Sun | G02B 6/12 | 385/14 |
| 2014/0036940 A1 * | 2/2014 | Tanaka | H01S 5/0617 | 372/20 |
| 2014/0086547 A1 * | 3/2014 | Chen | G02B 6/266 | 385/140 |
| 2014/0347735 A1 * | 11/2014 | Wakabayashi | G01J 3/26 | 359/580 |
| 2015/0016816 A1 * | 1/2015 | Piehler | H04B 10/071 | 398/10 |

* cited by examiner

FIG.8

| | | QUARTZ | ORGANIC MATERIAL SILICON RESIN |
|---|---|---|---|
| TRANSPARENCY | | TRANSPARENT | TRANSPARENT |
| REFRACTIVE INDEX | 25 deg C | 1.45 | 1.43 |
| | TEMPERATURE DEPENDENCY dn/dt | $1 \times 10^{-5}$ [°C-1] | $-1 \times 10^{-5}$ [°C-1] |
| THERMAL EXPANSION COEFFICIENT α | | $5.5 \times 10^{-7}$ [°C-1] | $1 \times 10^{-4}$ [°C-1] |
| THERMAL CONDUCTIVITY | | 2W/m/K | 0.2W/m/K |
| TEMPERATURE DEPENDENCY dλ/Dt | | 0.01 nm/°C | 1 nm/°C |

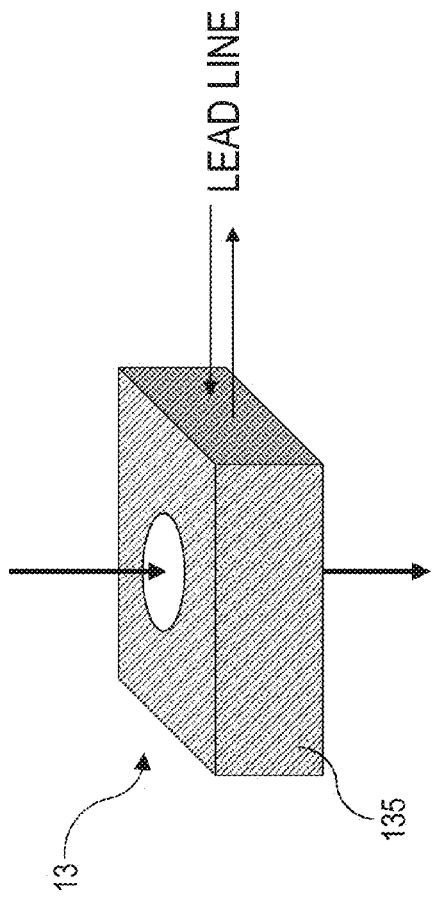
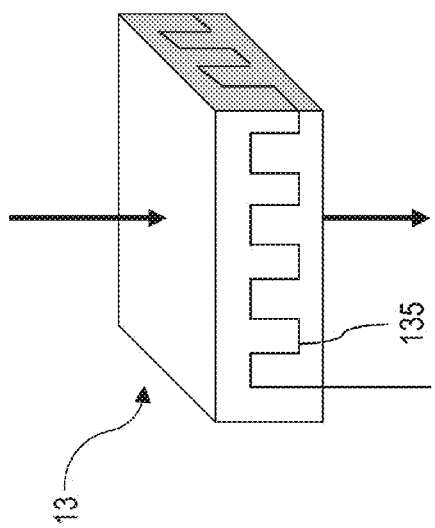

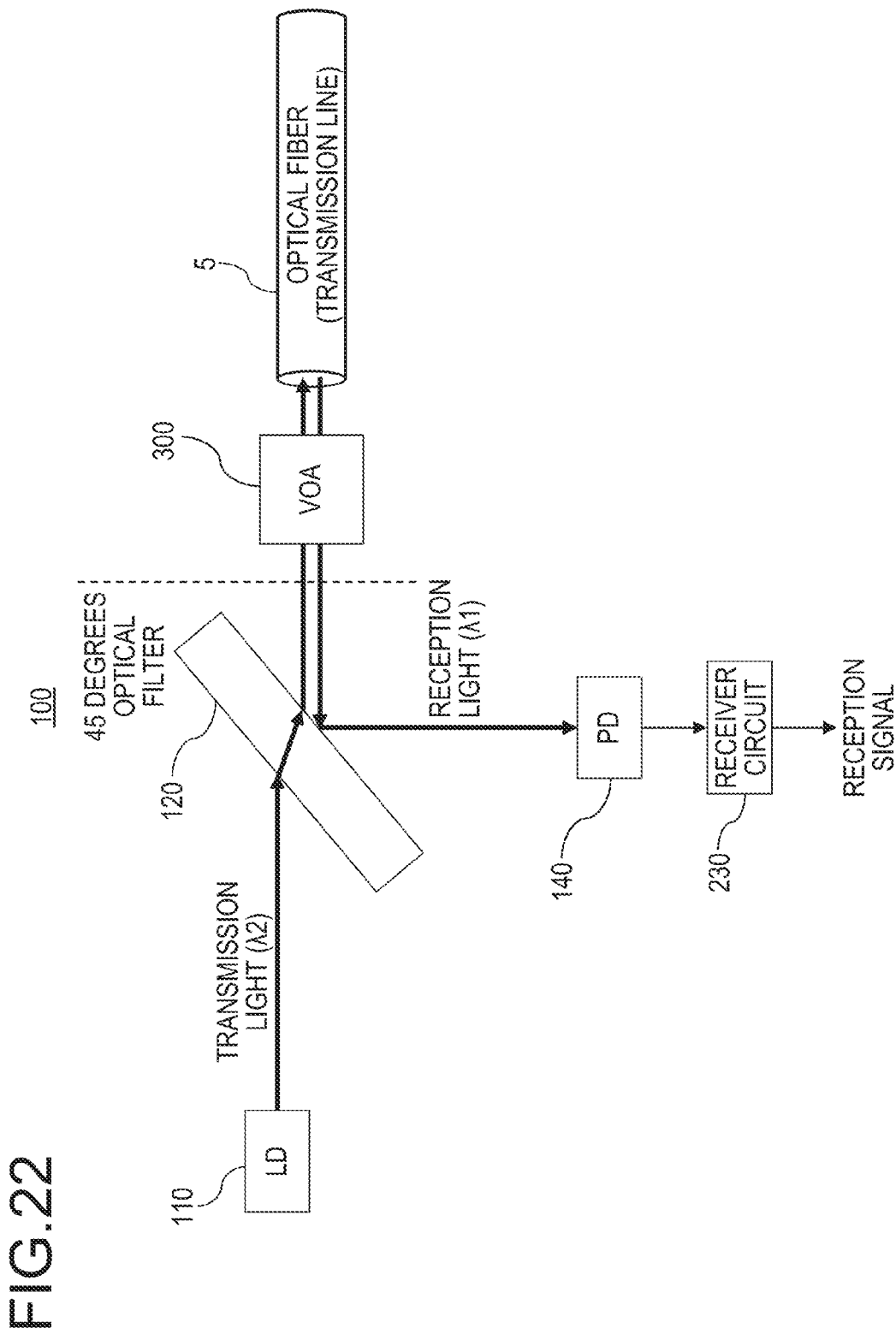

VARIABLE OPTICAL ATTENUATOR AND OPTICAL MODULE

CROSS-REFERENCE TO RELATED APPLICATION

This application is based upon and claims the benefit of priority from the prior Japanese Patent Application No. 2015-041057, filed on Mar. 3, 2015, the entire contents of which are incorporated herein by reference.

FIELD

The embodiments discussed herein are related to a variable optical attenuator and an optical module.

BACKGROUND

In the field of optical communication technologies, an optical signal transmitted from an optical transmitter to an optical fiber (transmission line) is received by an optical receiver. A light receiving element such as a photodiode (PD) or the like is used for the optical receiver. An example of the PD may include a Pin-PD, an avalanche PD (APD) and the like.

Related techniques are disclosed in, for example, Japanese Laid-Open Patent Publication No. 2008-244391.

SUMMARY

According to an aspect of the invention, a variable optical attenuator includes: a transparent medium configured to transmit light; a first reflective film formed on a light incidence surface of the transparent medium; a second reflective film formed on a light emission surface of the transparent medium; and a resonance length variable medium configured to vary an optical resonance length between the first reflective film and the second reflective film, wherein the first reflective film has a first reflectivity at which at least one of light of a first wavelength and light of a second wavelength is partially transmitted through the first reflective film, the at least one of light being the light of the first wavelength, and wherein the second reflective film has a second reflectivity lower than the first reflectivity for the light of the first wavelength and a third reflectivity lower than the second reflectivity for the light of the second wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a view illustrating the characteristics of an organic material (e.g., silicon resin) used for a transparent medium of the etalon filter illustrated in FIGS. 1 and 2 in comparison with quartz;

FIG. 9A is a view illustrating an example in which a thermoelectric medium of the etalon filter illustrated in FIGS. 1 and 2 is a thermoelectric wire;

FIG. 9B is a view illustrating an example in which a thermoelectric medium of the etalon filter illustrated in FIGS. 1 and 2 is a metal film;

FIG. 22 is a block diagram illustrating an exemplary configuration where a variable optical attenuator is disposed in the outside of the optical transceiver in the comparative example illustrated in FIG. 19.

DESCRIPTION OF EMBODIMENTS

Figure 1:
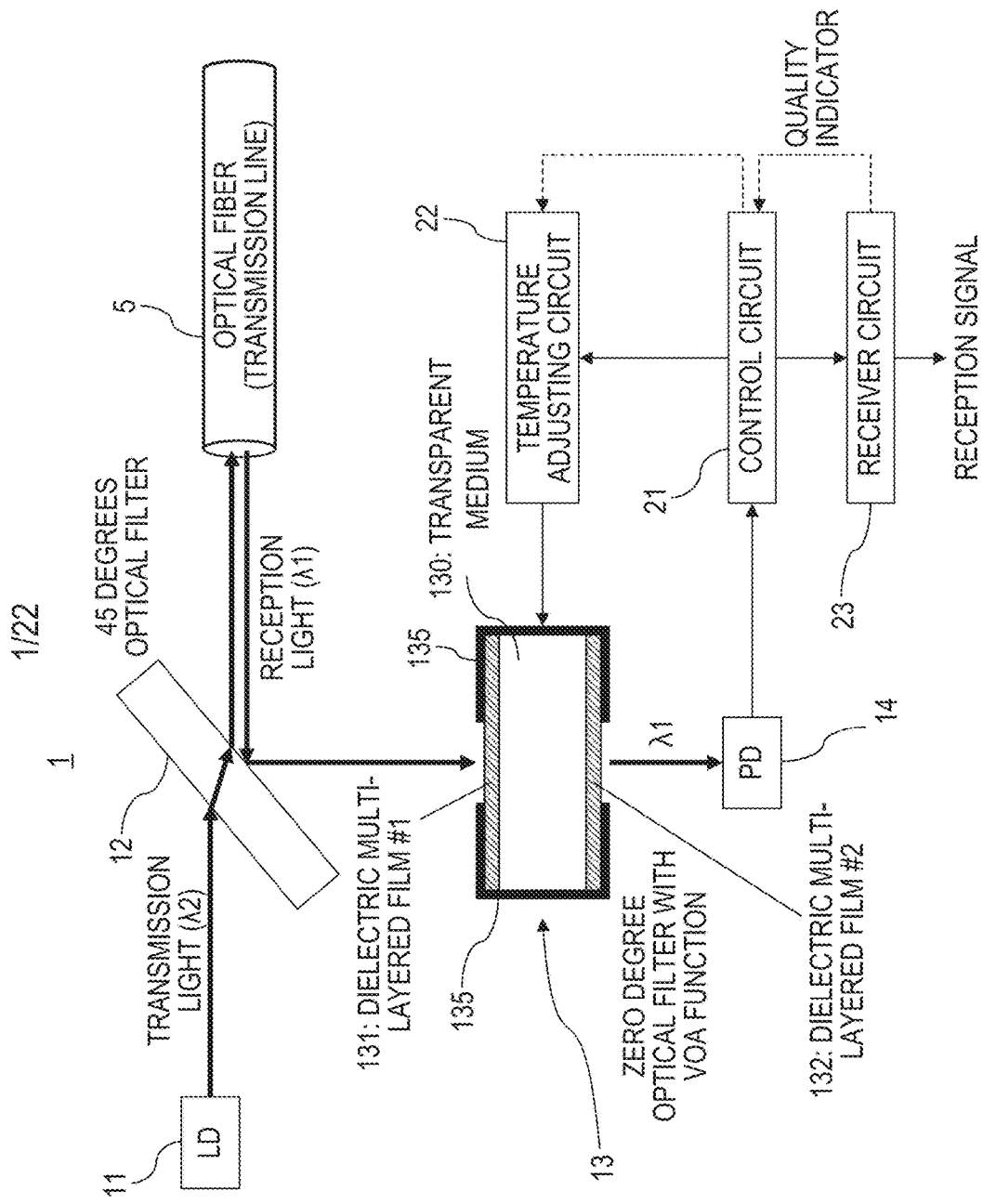
FIG. 1 is a block diagram illustrating an exemplary configuration of an optical transceiver according to an embodiment.

A PD has an upper limit in its receivable input light power range (which may be referred to as a "receivable light range"). The "receivable light range" may be exchanged with an "operation guarantee range" that guarantees a normal operation of the PD.

When a light having a power level exceeding the upper limit of the operation guarantee range is incident into the PD, a current exceeding a rated value flows in the PD, which may lead to a destruction of the PD in the worst case.

For example, an APD has the ability to detect incident light of a weak power level with a higher sensitivity as compared to a Pin-PD. However, it is likely that the device may be destroyed when the light having a strong power level exceeding the upper limit of the operation guarantee range is incident.

For this reason, an attempt has been made to use a variable optical attenuator (VOA) or the like to adjust (control) the power level of the light incident into the PD so that the power level can fall within the operation guarantee range of the PD.

However, under the current situations, there may be a case where a variable optical attenuator may have such a size that it is not allowed to be mounted on an optical module such as an optical transceiver or the like. In this case, an attempt has been made to dispose the variable optical attenuator in the outside of the optical module, for example, between the optical module and an optical fiber transmission line. However, such an attempt may cause a loss (attenuation) in not only the light received in the PD but also the light transmitted to the optical fiber transmission line.

Hereinafter, embodiments of techniques for implementing a compact variable optical attenuator capable of varying transmission light power efficiently for only the light of a specific wavelength will be described with reference to the drawings. However, the following embodiments are merely illustrative and are not intended to exclude application of other modifications and techniques which are not specified in the following description. In addition, various illustrative aspects described in the following description may be practiced in proper combination. Throughout the drawings used to explain the following embodiments, the same or similar elements or portions are denoted by the same reference numerals unless otherwise stated.

FIG. 1 is a block diagram illustrating an exemplary configuration of an optical transceiver according to an embodiment. As illustrated in FIG. 1, the optical transceiver 1 transmits light of a wavelength λ2 to an optical fiber 5, which is an example of an optical transmission line, and receives the light of a wavelength λ1 from the optical fiber 5.

In other words, the optical transceiver 1 is an example of an optical module capable of transmitting/receiving light having different wavelengths via the single optical fiber 5, which may be referred to as a "single-core bi-directional optical module (BiDi)."

As illustrated in FIG. 1, the optical transceiver 1 may include a light source 11, a 45 degrees incident optical filter 12, a zero degree incident optical filter 13, and a photodetector (or photodiode) (PD) 14. The optical transceiver 1 may further include a control circuit 21, a temperature adjusting circuit 22, and a receiver circuit 23.

The "45 degrees incident optical filter 12" may be abbreviated as a "45 degrees optical filter 12" or an "optical filter 12" and the "zero degree incident optical filter 13" may be abbreviated as a "zero degree optical filter 13" or an "optical filter 13."

For example, the light source 11 may be a semiconductor laser diode (LD) and generates light of a wavelength λ2. The light of wavelength λ2 may be referred to as a "transmission light" and the wavelength λ2 of the "transmission light" may be referred to as a "transmission wavelength." The LD 11 may be an LD with a fixed emission wavelength or a tunable LD with a variable emission wavelength.

For example, the 45 degrees incident optical filter 12 has the characteristic of emitting the wavelength λ2 light, which is incident at an incident angle of 45 degrees with respect to one (first) surface, from the other opposing surface (second surface) and reflecting the wavelength λ1 light which is incident at an incident angle of 45 degrees with respect to the second surface. This characteristic may be referred to as a "filter characteristic."

Therefore, the transmission light of the LD 11, which is the light having the transmission wavelength λ2, is transmitted to the optical fiber 5 through the 45 degrees optical filter 12 and the light having the wavelength λ1, which propagates in the opposite direction from the optical fiber 5, is reflected at the reflection surface of the 45 degrees optical filter 12.

In other words, the optical filter 12 is used in common for the transmission light of the wavelength λ2 and the reception light of the wavelength λ1, and can spatially separate the transmission light of the wavelength λ2 and the reception light of the wavelength λ1 from each other. The wavelength λ1 of the reception light is an example of a first wavelength and may be referred to as a "reception wavelength." The wavelength λ2 of the transmission light is an example of a second wavelength.

The reception wavelength λ1 is different from the transmission wavelength λ2 and may be, for example, shorter than the transmission wavelength λ2 (i.e., $\lambda 1 < \lambda 2$). As a non-limitative example, the reception wavelength λ1 may be a 1.3 μm wavelength band and the transmission wavelength λ2 may be a 1.49 μm wavelength band. However, the values of the wavelengths λ1 and λ2 are not limited to these wavelength bands. The magnitude relation between the wavelengths λ1 and λ2 may be reversed.

The direction in which the light of the transmission wavelength λ2 propagates in the optical fiber 5 may be referred to as an "upstream direction" and the opposite direction in which the light of the reception wavelength λ1 propagates may be referred to as a "downstream direction."

The reflected light of the reception wavelength λ1 reflected at the reflection surface of the 45 degrees optical filter 12 is, for example, guided to the zero degree optical filter 13 disposed in the reflection direction.

For example, the zero degree optical filter 13 is disposed such that the reception light of the wavelength λ1 reflected at the 45 degrees optical filter 12 is incident at an incident angle of zero degree. For example, the zero degree optical filter 13 may include a transparent medium 130, a first dielectric multi-layered film #1 131, and a second dielectric multi-layered film #2 132. The dielectric multi-layered films 131 and 132 are the examples of first and second reflection films, respectively.

The transparent medium 130 is, for example, a medium that transmits the light and may be made of organic material. One non-limitative example of the organic material is silicon resin. The reason or merit for application of the silicon resin as an example of the organic material to the transparent medium 130 will be described later.

Figure 2:
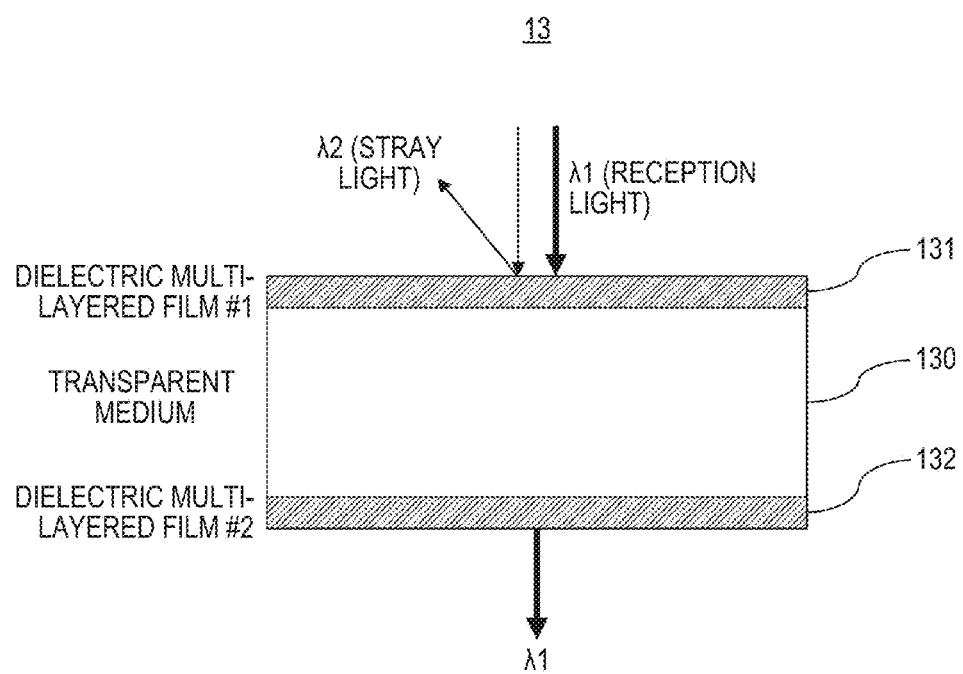
FIG. 2 is a schematic side view illustrating an exemplary configuration of a zero-degree incident optical filter (e.g., an etalon filter) illustrated in FIG. 1.

As illustrated in FIGS. 1 and 2, the first dielectric multi-layered film #1 131 may be formed on one surface (which may be referred to as a "first surface" or "light incidence surface") of the transparent medium 130 and the second dielectric multi-layered film #2 132 may be formed on the other surface (which may be referred to as a "second surface" or "light emission surface") of the transparent medium 130.

Figure 3A:
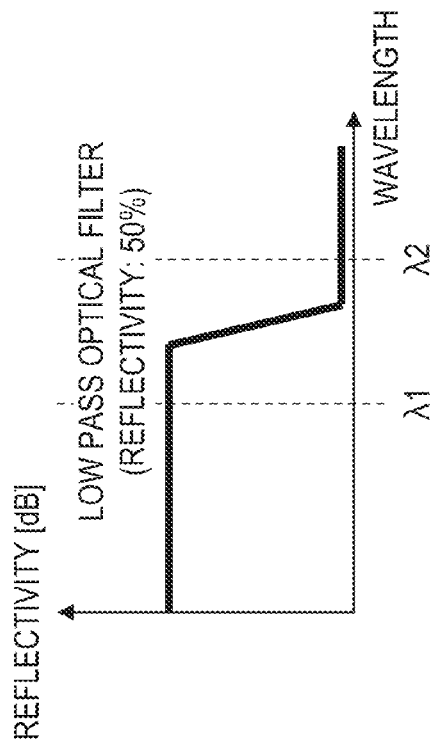
FIG. 3A is a view illustrating an example of the reflection characteristic of a first dielectric multi-layered film in the etalon filter illustrated in FIGS. 1 and 2.

The first dielectric multi-layered film 131 has a reflectivity which does not depend on a wavelength of incident light, for example, as illustrated in FIG. 3A, and is configured to reflect most of the incident light irrespective of the wavelength while transmitting only a portion of the incident light to the transparent medium 130.

In other words, the first dielectric multi-layered film 131 has the characteristic of transmitting a portion of light having the wavelengths $\lambda 1$ and $\lambda 2$ and reflecting the rest of the light. For example, the reflectivity (e.g., a first reflectivity) of the first dielectric multi-layered film 131 is lower than 100% and may be set to be as high as possible. In the example of FIG. 3A, the reflectivity is 99.5%.

The reflection characteristic of the first dielectric multi-layered film 131 may be referred to as the characteristic of suppressing transmission of light having the wavelengths $\lambda 1$ and $\lambda 2$. In the meantime, the light having the transmission wavelength $\lambda 2$ which is not coupled to the optical fiber 5 (which may be referred to as "stray light") may be incident from the 45 degrees optical filter 12 into the first dielectric multi-layered film 131.

Figure 3B:
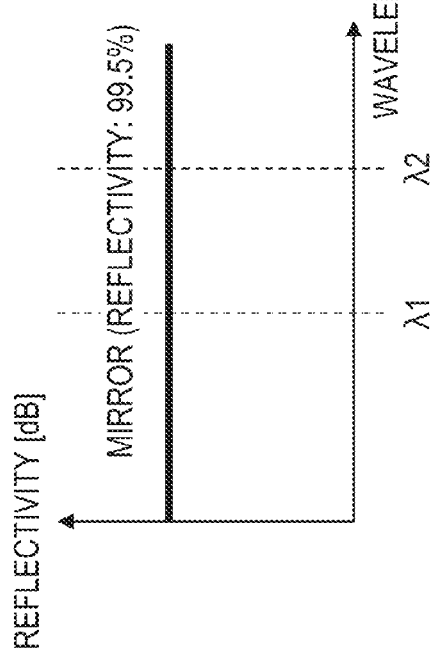
FIG. 3B is a view illustrating an example of the reflection characteristic of a second dielectric multi-layered film in the etalon filter illustrated in FIGS. 1 and 2.

In the meantime, the second dielectric multi-layered film 132 has the wavelength-dependent reflectivity, for example, as illustrated in FIG. 3B. For example, the second dielectric multi-layered film 132 has the characteristic of reflecting a portion of the light having the reception wavelength $\lambda 1$ and suppressing the reflection of the light having the transmission wavelength $\lambda 2$ (in other words, transmitting the light having the wavelength $\lambda 2$).

The light having the reception wavelength $\lambda 1$ is an example of light having a wavelength desired to be transmitted through the zero degree optical filter 13. For example, the reflectivity (e.g., a second reflectivity) of the second dielectric multi-layered film 132 for the reception wavelength $\lambda 1$ is, for example, 50% which is lower than the (first) reflectivity (e.g., 99.5%) of the first dielectric multi-layered film 131.

The reception wavelength $\lambda 1$ of the light reflected at the second dielectric multi-layered film 132 is multi-reflected through the transparent medium 130 between the first dielectric multi-layered film 131 and the second dielectric multi-layered film 132. A standing wave having the wavelength $\lambda 1$ is generated in the transparent medium 130 by a light interference of the multi-reflection (in other words, a "resonance"). Therefore, the light power of the wavelength $\lambda 1$ is strengthened to be emitted from the second dielectric multi-layered film 132.

In other words, the zero degree optical filter 13 is an example of an etalon filter using a Fabry-Perot interferometer, and strengthens and emits the incident the light of wavelength $\lambda 1$ by resonating this light in the transparent medium 130 between the dielectric multi-layered films 131 and 132.

The transparent medium 130 interposed between the dielectric multi-layered films 131 and 132 may be considered to correspond to a "spacer 130" which determines the distance between the dielectric multi-layered films 131 and 132. The thickness d of the spacer 130 in the direction of transmission of light incident into the spacer 130 determines an interference distance (i.e., an optical resonance length) between the dielectric multi-layered films 131 and 132.

In the meantime, having transmitted through the first dielectric multi-layered film 131, a portion of light having the transmission wavelength $\lambda 2$ transmits through the second dielectric multi-layered film 132, together with the light having the reception wavelength $\lambda 1$, without being substantially reflected at the second dielectric multi-layered film 132. In other words, the second dielectric multi-layered film 132 may have a (third) reflectivity (e.g., substantially 0%) for the light having the transmission wavelength $\lambda 2$, which is lower than the (second) reflectivity (e.g., 50%) for the light having the reception wavelength $\lambda 1$.

Therefore, even when the light having the transmission wavelength $\lambda 2$ is incident into the transparent medium 130 through the first dielectric multi-layered film 131, the reflection of the light from the second dielectric multi-layered film 132 to the transparent medium 130 is suppressed. On this account, no resonance occurs since the light having the transmission wavelength $\lambda 2$ is not multi-reflected between the dielectric multi-layered films 131 and 132. As a result, a standing wave of the light having the transmission wavelength $\lambda 2$ is not generated (or suppressed) in the transparent medium 130.

Further, since the light having the transmission wavelength $\lambda 2$ is mostly reflected ("cut") at the first dielectric multi-layered film 131 as illustrated in FIG. 3A, it may be considered that the reception of the light having the reception wavelength $\lambda 1$ is barely affected even when the light having the transmission wavelength $\lambda 2$ transmits through the second dielectric multi-layered film 132.

In other words, the first dielectric multi-layered film 131 may have such a reflection characteristic that, assuming that the light having the desired reception wavelength $\lambda 1$ can transmit through the transparent medium 130 with a power sufficient to generate a standing wave, the light having the undesired reception wavelength $\lambda 2$ is allowed to transmit through the transparent medium 130 with the power less than the power sufficient to generate a standing wave.

In the meantime, the second dielectric multi-layered film 132 may have such a reflection characteristic that it reflects a portion of the light having the desired reception wavelength $\lambda 1$ in order to generate a standing wave in the transparent medium 130 and suppresses the reflection of the light having the undesired reception wavelength $\lambda 2$ so as not to generate a standing wave.

By setting the reflection (or transmission) characteristics of the first and second dielectric multi-layered films 131 and 132 as described above, it is possible to significantly reduce the light having the undesired reception wavelength $\lambda 2$ as compared with the light having the desired reception wavelength $\lambda 1$ while intensifying and emitting the light having the desired reception wavelength $\lambda 1$ through a light interference.

Next, the transmission characteristic of the etalon filter 13 will be described with reference to FIGS. 4 to 6. As illustrated in FIG. 5, the etalon filter 13 has transmission characteristic where a peak of transmittance occurs periodically in a certain wavelength region.

The periodic transmission characteristic nay be, for example, represented by a finesse, a free spectral range (FSR), and a wavelength resolution (or full width at half maximum (FWHM)). For example, the "finesse," "FSR" and "FWHM" may be expressed by the following Equations 1 to 3, respectively.

$$\text{Finesse} = \frac{\pi\sqrt{R}}{1-R} \quad \text{[Eq. 1]}$$

$$FSR = \frac{\lambda^2}{2nd} \quad \text{[Eq. 2]}$$

$$FWHM = \frac{FSR}{\text{Finesse}} \quad \text{[Eq. 3]}$$

Figure 4:
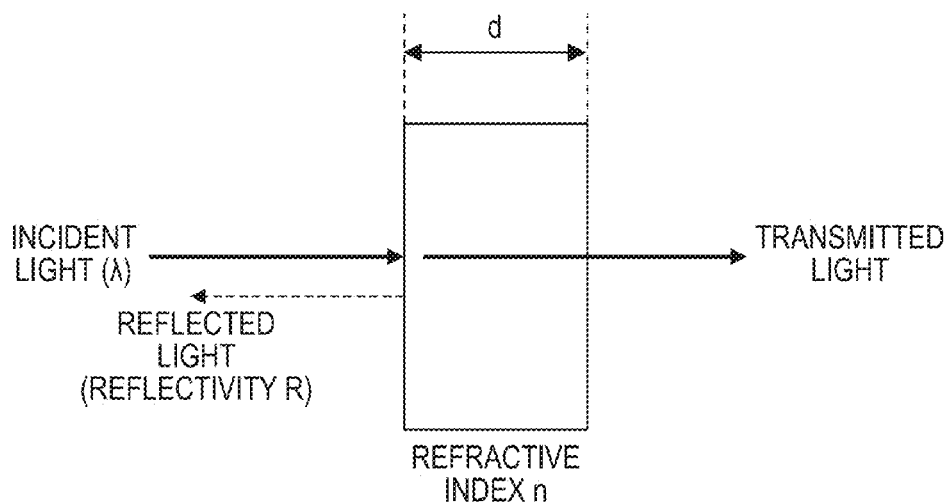
FIG. 4 is a schematic view for explaining the transmission characteristic of the etalon filter illustrated in FIGS. 1 and 2.
Figure 5:
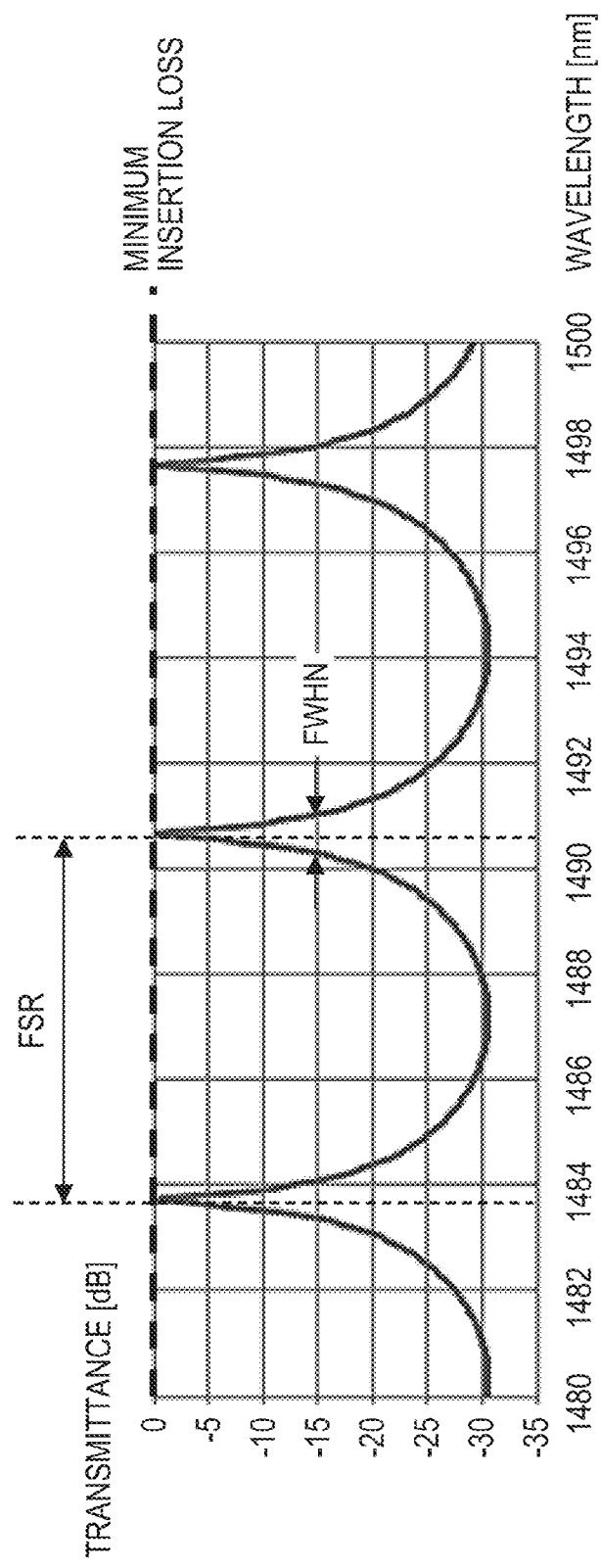
FIG. 5 is a view illustrating an example of the transmission characteristic of the etalon filter illustrated in FIGS. 1 and 2.

Where, as illustrated in FIG. 4, "R" represents a reflectivity of incident light (having a wavelength λ) to the etalon filter 13, "n" represents a refractive index of the etalon filter 13 (the transparent medium 130), and "d" represents a distance (resonance length) corresponding to the thickness of the transparent medium (spacer) 130 in the transmission direction.

As can be understood from Equation 2, the FSR is changed with the change in the refractive index n of the transparent medium 130 and the resonance length d. For example, as illustrated in FIG. 5, the FSR corresponds to a peak-to-peak distance of the transmittance of light having a wavelength λ. The peak-to-peak distance is changed with the change in the refractive index n and the resonance length d. For example, the FSR is decreased with an increase in one or both of the refractive index n and the resonance length d when the wavelength λ is fixed.

As can be understood from Equations 1 and 3, when the FSR is changed, the wavelength resolution (or FWHM) of the etalon filter 13 is accordingly changed. For example, when the reflectivity R for the wavelength λ is constant and the FSR is decreased, the FWHM is accordingly decreased. When the FWHM is decreased, a change in the transmittance for a change in the wavelength is increased and the sensitivity of the transmittance change for the wavelength is accordingly increased.

FIG. 5 illustrates an example of the reflection characteristics of the dielectric multi-layered films 131 and 132 which are set such that three transmittance peaks (in other words, standing waves having the particular wavelength λ) are generated in a wavelength range centered at 1.49 μm (e.g., ranging from 1480 nm to 1500 nm). The wavelength range ranging from 1480 nm to 1500 nm may be considered to correspond to a wavelength range to which a wavelength of an optical signal can be set (which may be referred to as a "signal wavelength range").

Figure 7:
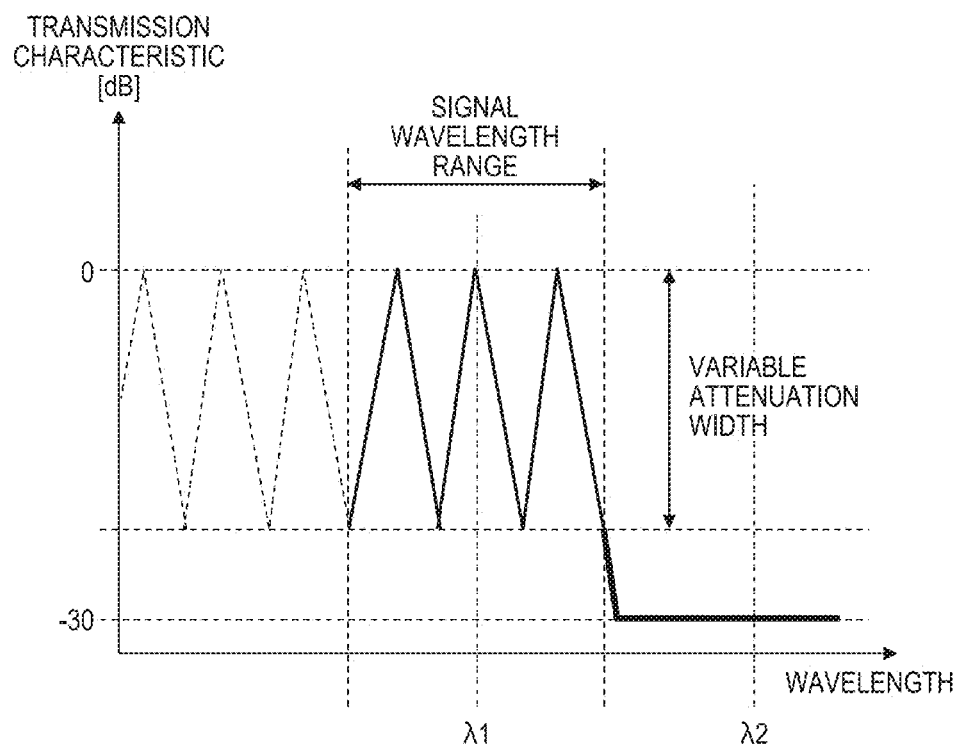
FIG. 7 is a view illustrating an example of setting of the transmission characteristic of the etalon filter illustrated in FIGS. 1 and 2 in a signal wavelength range.

As illustrated in FIG. 7, an optical signal having the reception wavelength λ1 is set to an wavelength in the signal wavelength range. The example illustrated in FIGS. 5 and 7 illustrates three transmittance peaks appearing periodically for the wavelength λ1 in the signal wavelength range.

Figure 6:
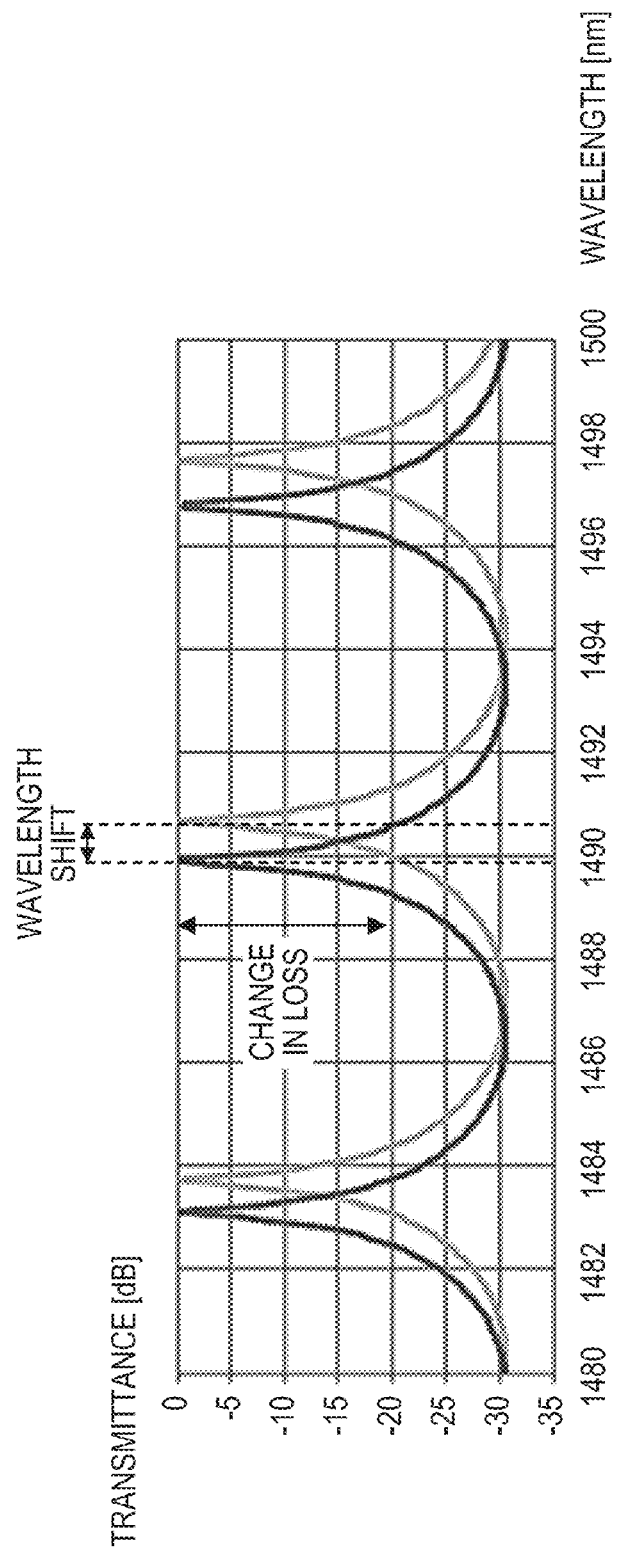
FIG. 6 is a view illustrating an example of a change in loss corresponding to a wavelength shift of the transmission characteristic of the etalon filter illustrated in FIGS. 1 and 2.

Here, as illustrated in FIG. 6, when the resonance length d of the etalon filter 13 is changed, the FSR is accordingly changed, thereby allowing a transmittance peak of the light having a wavelength of interest to be shifted in the wavelength direction.

The transmittance of the light having the wavelength of interest is changed in response to the wavelength shift and an optical loss of the wavelength of interest is accordingly changed. In the example of FIG. 6, paying attention on a wavelength of 1490 nm, it can be seen that the transmittance is continuously changed within a range of about 0 [dB] to −20 [dB] in response to the wavelength shift.

Therefore, the etalon filter 13 can function as a variable optical attenuator (VOA) with a variable optical loss of a wavelength of interest. A loss by the VOA function may be referred to as a "VOA loss."

It may be considered that the transmittance of 0 [dB] of the etalon filter 13 corresponds to the minimal VOA loss and the transmittance of −20 [dB] thereof corresponds to the maximal VOA loss.

When the wavelength of interest is the above-described wavelength λ1, the etalon filter 13 can vary the power of the transmission light having the reception wavelength λ1, as illustrated in FIG. 7, by varying the VOA loss between the minimal value and the maximum value. Therefore, the zero degree optical filter 13 may be referred to as an "etalon filter 13 with VOA function."

As described above, when the zero degree optical filter 13 has the etalon filter structure having the reflection characteristic illustrated in FIGS. 3A and 3B, it is possible to achieve a compact filter capable of efficiently varying the power of the transmission light having a specified wavelength (e.g., λ1).

In the meantime, in the signal wavelength range, a value of the (reception) wavelength λ1 assigned for transmission of an optical signal may be unknown or there may occur a variation of ±10 nm or so in the wavelength λ1. For example, in the example of FIG. 7, assume that there is a possibility that the wavelength λ1 is located in one of three wavelength regions in the signal wavelength range: a short wavelength side, a long wavelength side, and an intermediate wavelength side.

Even in such a case, it is possible to continuously adjust (control) the power of the transmission light having the wavelength λ1 with a VOA loss according to the wavelength shift of the transmittance peak closest to the actual wavelength position of the wavelength λ1 among a plurality of transmittance peaks of the etalon filter 13 which appear in the signal wavelength range.

Therefore, it is possible to continuously adjust the power of the transmission light having the wavelength λ1 with a less wavelength shift with increase in the number of periodic transmittance peaks of the wavelength λ1 which appear in the signal wavelength range.

However, since a change in transmittance in the wavelength direction becomes steeper with increase in the number of transmittance peaks, the VOA loss is greatly varied even with a small amount of wavelength shift. On this account, the excessive increase in the number of transmittance peaks may result in a difficulty or an impossibility of the VOA loss control. Accordingly, the number of transmittance peaks in the signal wavelength range may be appropriately set according to a VOA loss width to be realized.

Next, returning to FIG. 1, descriptions will be focused on a control system of the zero degree optical filter (etalon filter) 13. Although the transparent medium 130 of the etalon filter 13 may be made of quartz, in this embodiment, the transparent medium 130 is made of an organic material (e.g., silicon resin) having a greater dependency of refractive index change and resonance length change on temperature as compared to a case with quartz.

Since the refractive index n and the resonance length d of the transparent medium 130 made of silicon resin are greatly varied depending on a change in temperature as compared with quartz, it is possible to obtain a more amount of wavelength shift, i.e., a greater variable width (variable attenuation width) of VOA loss, with a less change in temperature.

For example, assuming that a refractive index and a thermal expansion coefficient of silicon material are respectively "n" and "a," the relationship between wavelength change (Δλ) corresponding to the wavelength shift and temperature change (ΔT) can be expressed by the following Equation 4.

$$\frac{\Delta\lambda}{\Delta T} = \frac{\lambda}{n}\frac{dn}{dT} + \lambda\alpha \qquad [\text{Eq. 4}]$$

FIG. 8 illustrates an example of dependency of refractive index on temperature (dn/dT), thermal expansion coefficient α, thermal conductivity, and dependency of wavelength change on temperature (dλ/dT) of silicon resin in comparison with quartz. As can be understood from FIGS. 4 and 8, the silicon resin can obtain a change in refractive index which is about ten times as large as quartz glass for the same temperature change.

In addition, since the thermal conductivity of the silicon resin is smaller by one digit than that of quartz, the silicon resin can obtain a change in refractive index which is larger by two digits or more than quartz for the same power. In other words, in order to obtain the same change in refractive index, the silicon resin requires only far less power consumption than quartz.

By taking advantage of such characteristics of the silicon resin, the etalon filter 13 of this embodiment can realize a larger variable attenuation width with a less change in temperature and less power consumption than quartz used in the transparent medium 130.

However, the material used for the transparent medium 130 may not be limited to the silicon resin. For example, the transparent medium 130 may be made of any transparent material as long as it can obtain a larger change in refractive index with a smaller change in temperature than quartz and has a high thermal conductivity capable of obtaining a larger change in temperature with less heating amount.

Temperature control of the etalon filter 13 can be realized by attaching a thermoelectric medium 135, which can control a heat generation and a heat absorption by a current control, to the etalon filter 13, and controlling a current applied to the thermoelectric medium 135, for example, as illustrated in FIG. 1.

One example of the thermoelectric medium 135 may include a heater, a Peltier element or the like. The current control of the thermoelectric medium 135 may be, for example, performed by the temperature adjusting circuit 22 illustrated in FIG. 1. The temperature adjusting circuit 22 may be a circuit separate from the control circuit 21, as illustrated in FIG. 1, but may be incorporated in the control circuit 21. In other words, the temperature adjusting circuit 22 may be integrated with the control circuit 21 and the temperature control of the etalon filter 13 may be performed by the control circuit 21. The control circuit 21 may be referred to as a "control part 21."

In the meantime, when a heater which is lower in power consumption and less expensive than a Peltier element is used for the thermoelectric medium 135, the etalon filter 13 may be controlled to a temperature (>70° C.) higher than the environmental temperature (e.g., 0 to +70° C.). In other words, the target temperature of the etalon filter 13 may be controlled, for example, to a temperature higher than the environmental temperature by means of the heater.

For example, as schematically illustrated in FIG. 9A, the thermoelectric medium 135 may be a thermoelectric wire wired on a surface of the etalon filter 13 which does not interfere with an optical path of input/output light. Bonding may be used for the wiring of the thermoelectric wire 135.

Alternatively, for example, as schematically illustrated in FIG. 9B, the thermoelectric medium 135 may be a metal film wired on any surface of the etalon filter 13 which does not interfere with an optical path of input/output light of the etalon filter 13. Deposition may be used to form the metal film 135.

For example, a nickel/chromium alloy or platinum may be used for the thermoelectric wire or metal film serving as an example of the thermoelectric medium 135. However, the thermoelectric medium 135 may be made of any material as long as it can control the heat generation and heat absorption by flowing a current.

Returning to FIG. 1, the PD 14 as an example of a light receiving element or light receiving device receives the light transmitted through the etalon filter 13 and outputs an electric signal (e.g., a current value) based on a level of power of the received light to the control circuit 21. The current value based on the received light power level of the PD 14 may be converted to a voltage value by means of a transimpedance amplifier (TIA) or the like. For example, the TIA may be incorporated in the control circuit 21.

In the meantime, for example, an avalanche PD (APD) capable of detecting input light of weak power with high sensitivity may be used as the PD 14. For this reason, in the following description, the PD 14 is sometimes referred to as an "APD 14."

The control circuit 21 controls the temperature adjusting circuit 22 based on the electric signal which is input from the PD 14 and is based on the received light power level. According to the control, the temperature of the etalon filter 13 is controlled by the temperature adjusting circuit 22 such that the periodic transmission characteristic of the etalon filter 13 is controlled. As a result, the VOA loss of the etalon filter 13 is controlled such that the transmission light power of the etalon filter 13 is accordingly controlled.

While monitoring the received light power level of the PD 14, the control circuit 21 controls the temperature adjusting circuit 22 to adjust the temperature of the etalon filter 13 such that the received light power level of the PD 14 becomes a power level suitable for reception processing in the receiver circuit 23.

This temperature control may be performed in such a manner that the transmission light power of the etalon filter 13 falls within a receivable light range (operation guarantee range) of the PD 14. This can prevent a current exceeding the rated value from flowing into the PD 14 and prevent light having a power exceeding an upper limit of the receivable light range from being incident into the PD 14, thereby preventing the PD 14 from being damaged.

In the meantime, the temperature control of the etalon filter 13 (i.e., a VOA loss control) may be performed based on a quality indicator of received optical signal, for example, as indicated by a dotted line in FIG. 1, in addition to a result of monitoring for the received light power level of the etalon filter 13.

One non-limitative example of the quality indicator of received optical signal may include an Optical Signal to Noise Ratio (OSNR), a Bit Error Rate (BER) or the like. For example, the OSNR or BER may be detected by the receiver circuit 23 or a detecting circuit (not illustrated) separate from the receiver circuit 23. The temperature control of the etalon filter 13 (the VOA loss control) may be performed to improve a monitor value of the OSNR or BER.

(One Example of Temperature Control of Etalon Filter)

As described above, the etalon filter 13 has the transmission characteristic that is varied (e.g., shifted in the wavelength direction) depending on the change in temperature.

Therefore, the transmission characteristic of the etalon filter 13 can be also varied by a change in environmental temperature in a place where the etalon filter 13 is located (e.g., the optical transceiver 1).

In other words, the absolute value of the transmission characteristic of the etalon filter 13 is indefinite. In addition, the wavelength λ1 of the received light may be sometimes varied by about ±20 nm. Therefore, for example, at the time of starting of the optical transceiver 1, the power of light incident into the PD 14 is indefinite. Therefore, at the time of starting of the optical transceiver 1, the light with excessive power may be incident from the etalon filter 13 into the PD 14, which may result in a damage to the PD 14.

Figure 10:
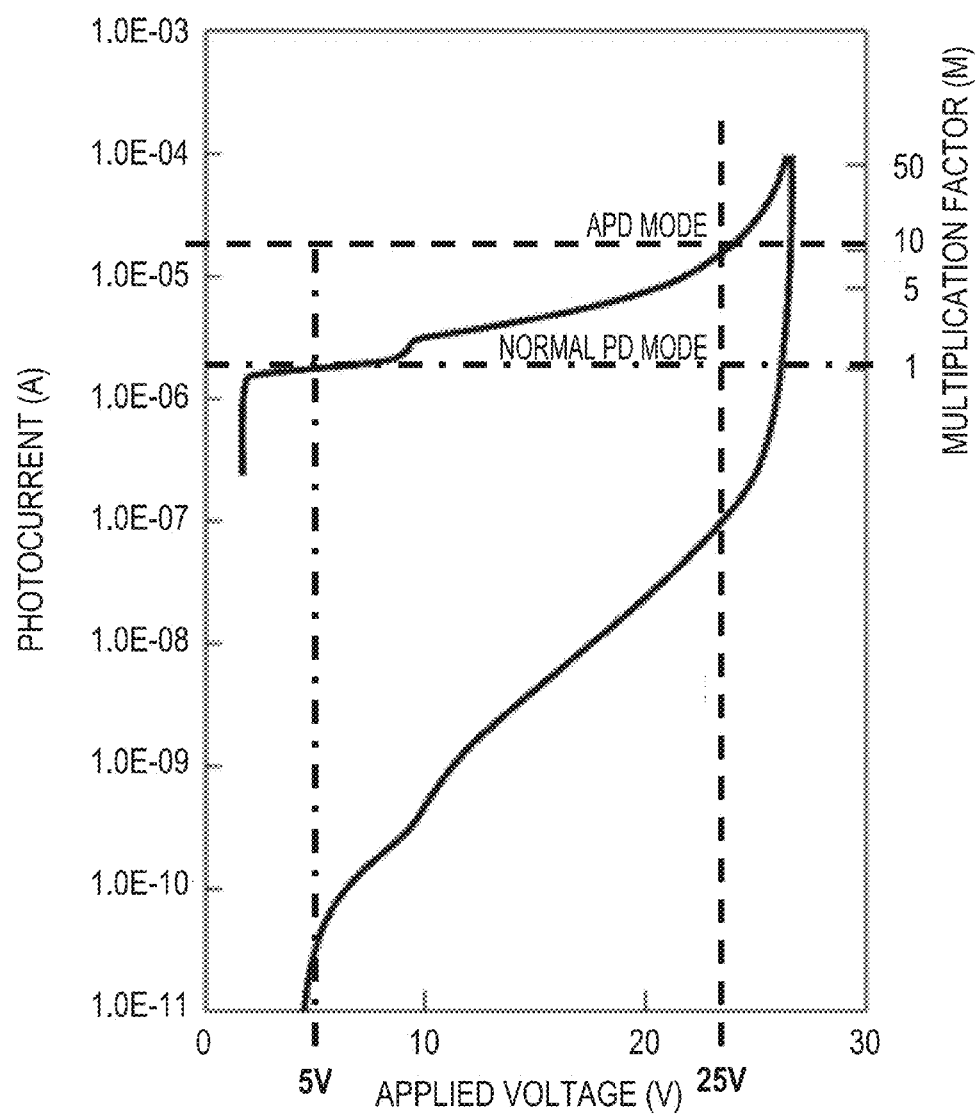
FIG. 10 is a view illustrating an example of the characteristic of an avalanche PD (APD) which is an example of a photodiode (PD) illustrated in FIG. 1.

As illustrated I FIG. 10, the multiplication factor of the APD 14 tends to increase with an increase in a bias voltage (also referred to as a "reverse voltage") Vb applied to the APD 14. As one non-limitative example, in the example of FIG. 10, the multiplication factor of 1.0 (see, e.g., a dashed-dotted line) is obtained at the bias voltage Vb of 5V and the multiplication factor of 10.0 (see, e.g., a dotted line) is obtained at the bias voltage Vb of 25V. In the following description, for the sake of convenience, a mode of the APD 14 operating at Vb=5V may be sometimes referred to as a "normal mode" and a mode of the APD 14 operating at Vb=25V may be sometimes referred to as an "APD mode."

In this case, at the time of starting of the optical transceiver 1, despite the fact that the input light power of the APD 14 is indefinite, when the APD 14 is operated in the APD mode (Vb=25V), there is a possibility that an excessive photocurrent flows into the APD 14 due to a multiplication factor higher than that in the normal mode.

Accordingly, in this embodiment, for example, the APD 14 is set to the "normal mode" at the time of starting (i.e., power-ON) of the optical transceiver 1 and the APD 14 is set to the "APD mode" in the subsequent normal operation. The setting of the "normal mode" and "APD mode" may be referred to as an "APD bias control."

Figure 11:
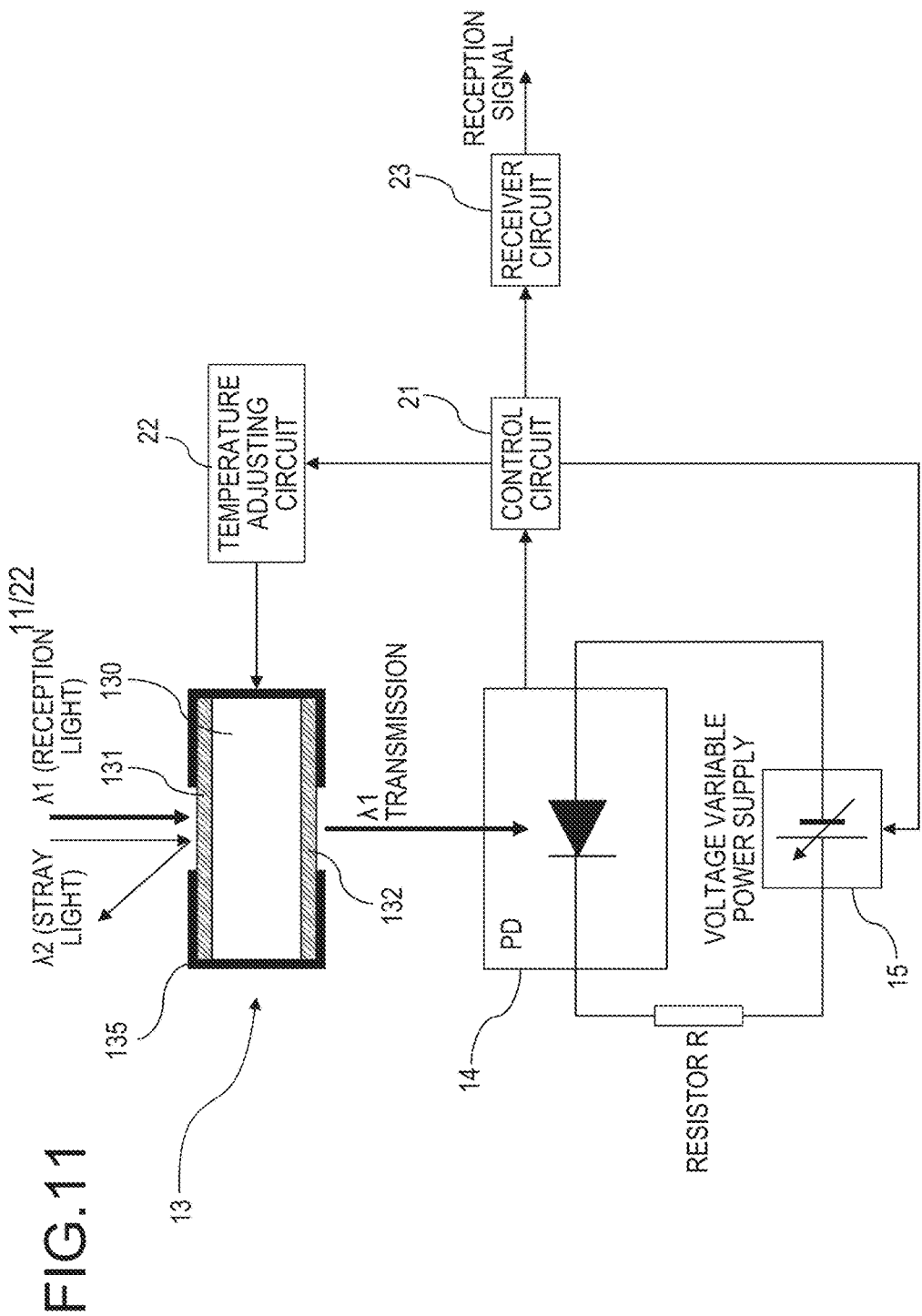
FIG. 11 is a block diagram illustrating an exemplary configuration of the optical transceiver illustrated in FIG. 1, with an attention paid to an APD bias control system.
Figure 12:
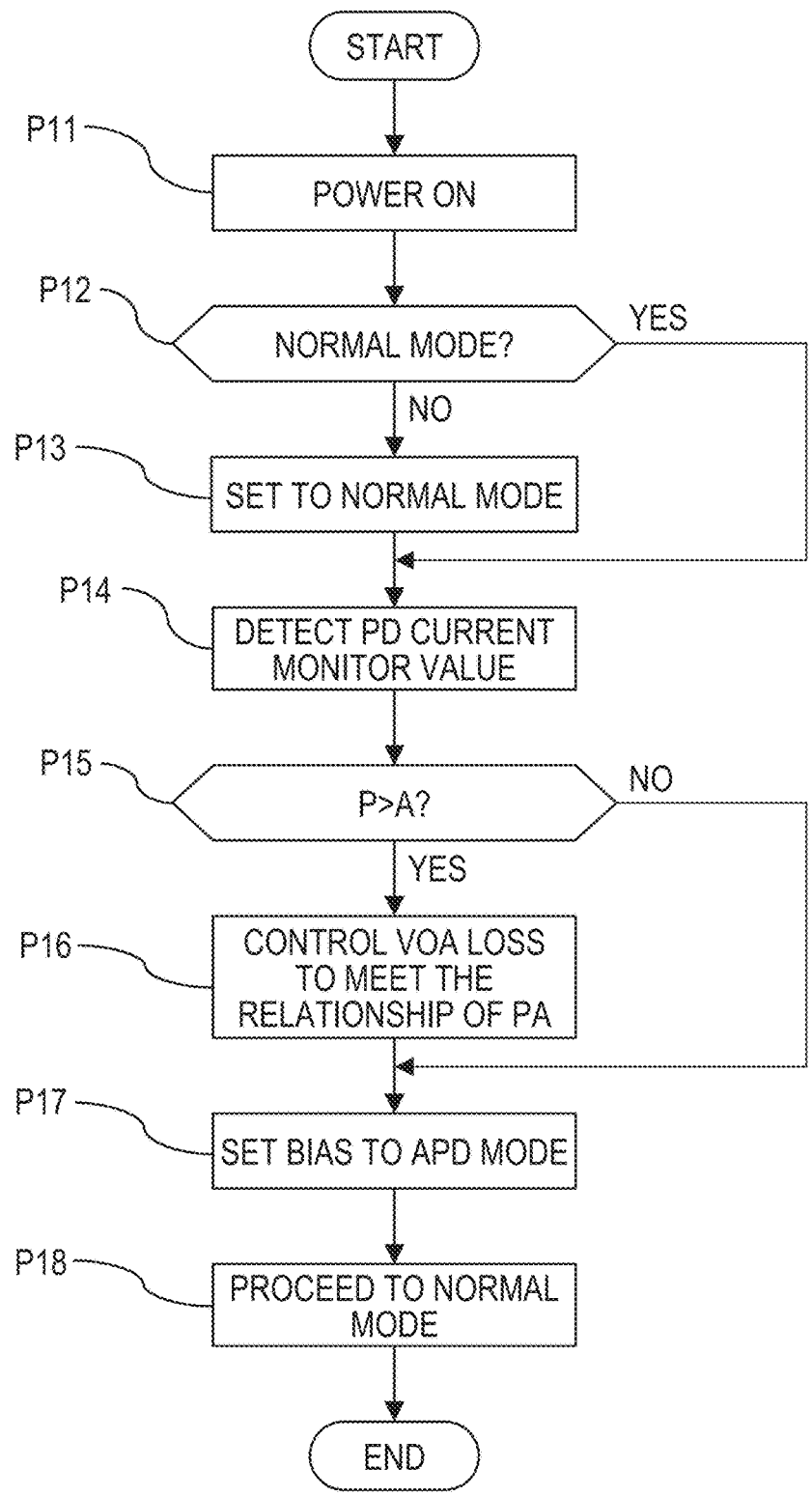
FIG. 12 is a flow chart illustrating an example of an APD bias control and a VOA loss control at the time of starting the optical transceiver illustrated in FIGS. 1 and 11.

Hereinafter, details of the above-described embodiments will be described with reference to FIGS. 11 and 12. FIG. 11 is a block diagram illustrating an exemplary configuration of the optical transceiver 1 illustrated in FIG. 1, with attention paid to an APD bias control system. FIG. 12 is a flow chart illustrating an example of an APD bias control and a VOA loss control at the time of starting of the optical transceiver 1.

As illustrated in FIG. 11, a voltage variable power supply 15 may be electrically connected to the APD 14 via a resistor R. For example, the voltage variable power supply 15 can apply a variable bias voltage Vb to the APD 14 under the control of the control circuit 21. For example, a voltage variable range of the voltage variable power supply 15 may be 0V to 25V.

In the meantime, the voltage variable power supply 15 may be a "voltage switchable power supply" capable of switching the APD 14 between bias voltages (e.g., 0V and 25V) corresponding respectively to the "normal mode" and the "APD mode." Hereinafter, the voltage variable power supply 15 may be sometimes referred to as a "bias power supply 15."

(At the Time of Starting of Optical Transceiver)

As illustrated in FIG. 12, when the optical transceiver 1 is powered ON and started (Operation P11), the control circuit 21 checks whether or not the APD 14 is set to the "normal mode" (e.g., Vb=5V) (Operation P12). In other words, the control circuit 21 checks a current status of bias voltage Vb applied from the bias power supply 15 to the APD 14.

When it is determined that the APD 14 is not set to the "normal mode" (NO in Operation P12), in other words, that the APD 14 is set to the "APD mode" (e.g., Vb=25V), the control circuit 21 sets the APD 14 to the "normal mode" (Operation P13).

Otherwise, when it is determined that the APD 14 is set to the "normal mode" (YES in Operation P12), the control circuit 21 may not perform a change in mode setting.

With the APD 14 set to the "normal mode," a value of current output from the APD 14 (which may be referred to as a "PD current monitor value") is detected in the control circuit 21 (Operation P14).

The control circuit 21 determines whether or not a received light power level P indicated by the detected PD current monitor value exceeds a predetermined threshold A (Operation P15). For example, the threshold A may be set to a power level which causes no damage to the APD 14 while the APD 14 is operating in the "APD mode."

Figure 15:
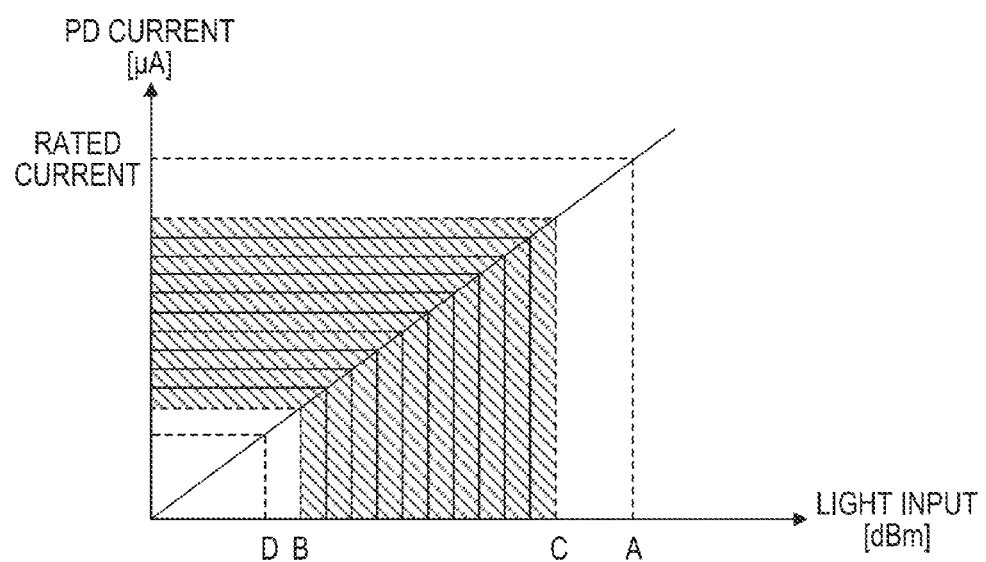
FIG. 15 is a view illustrating an example of the characteristic of current for a received light power level of the PD illustrated in FIGS. 1 and 11.

For example, as illustrated in FIG. 15, assuming that the received light power level of the APD 14 is in proportion to a current flowing through the APD 14, the threshold A may be set to less than the upper limit of the light receivable range of the APD 14. The threshold A may be stored in a memory device or memory medium such as a memory included in the control circuit 21.

When it is determined that the received light power level P of the APD 14 exceeds the threshold A (i.e., P>A) (YES in Operation P15), the control circuit 21 instructs the temperature adjusting circuit 22 to increase the VOA loss of the etalon filter 13.

The temperature adjusting circuit 22 controls the temperature of the etalon filter 13 such that the VOA loss of the etalon filter 13 is increased, for example, by controlling a current flowing into the thermoelectric medium 135 of the etalon filter 13 according to an instruction from the control circuit 21.

The control circuit 21 and the temperature adjusting circuit 22 may control an increase of the VOA loss of the etalon filter 13 until the received light power level P of the APD 14 reaches the threshold A or less (P≤A) (Operation P16).

When the received light power level P of the APD 14 reaches the threshold A or less, the control circuit 21 may control the bias power supply 15 to set the APD 14 to the "APD mode" (Operation P17). For example, an output voltage of the bias power supply 15 may be controlled such that Vb (=25V) is applied to the APD 14.

Thereafter, the APD 14 is operated in the "APD mode" and the optical transceiver 1 may proceed to the normal operation (Operation P18).

As described above, at the time of starting of the optical transceiver 1, the control circuit 21 operates the APD 14 in the "normal mode" and monitors the input (received) light power level P of the APD 14. If the input light power level P of the APD 14 exceeds the threshold A, the control circuit 21 controls the VOA loss of the etalon filter 13 to lower the input light power level P of the APD 14. Thereafter, the control circuit 21 sets the APD 14 to the "APD mode" to raise the bias voltage Vb.

According to the above-described control, even when the transmission characteristic of the etalon filter 13 is indefinite and the reception wavelength λ1 is varied due to a change in environmental temperature, it is possible to adjust the input light power level P of the APD 14 to an appropriate level which causes no damage to the APD 14.

As a result, for example, at the time of starting of the optical transceiver 1, it is possible to prevent the APD 14 from being damaged due to an unintended excessive power level of light input from the etalon filter 13 into the APD 14.

(In Normal Operation of Optical Transceiver)

Figure 13:
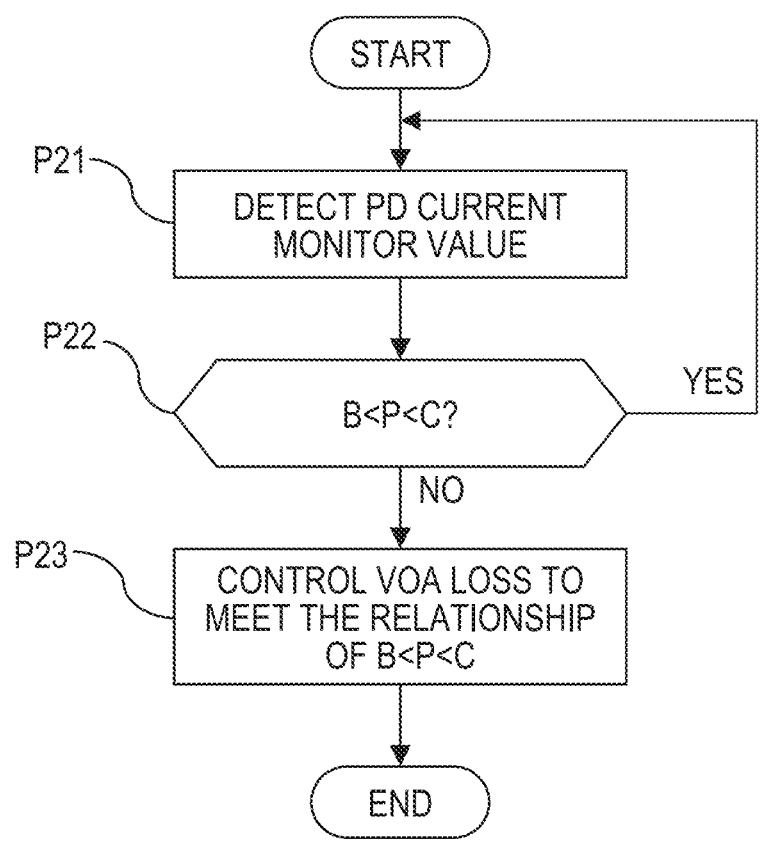
FIG. 13 is a flow chart illustrating an example of a VOA loss control in the normal operation after starting the optical transceiver illustrated in FIGS. 1 and 11.

Next, with reference to FIG. 13, descriptions will be made on an example of the VOA loss control in the normal operation of the optical transceiver 1 after being started.

As described above with reference to FIG. 12, the APD 14 is set to the "APD mode" after the starting of the optical transceiver 1. As illustrated in FIG. 13, with the APD 14 set to the "APD mode," a PD current monitor value output from the APD 14 is detected in the control circuit 21 (Operation P21).

The control circuit 21 determines whether or not a received light power level P indicated by the detected PD current monitor value falls within a predetermined appropriate range (e.g., a range satisfying the relation of "B<P<C" illustrated in FIG. 15) (Operation P22).

The lower limit (threshold) B of the appropriate range may be set, for example, to an input light power level satisfying the minimal reception sensitivity of the APD 14. The upper limit (threshold) C of the appropriate range may be set to less than the upper limit of the light receivable range of the APD 14.

The thresholds B and C may be set in consideration of the specifications of individual APDs 14, TIAs and the like. As in the above-described threshold A, the thresholds B and C may be also stored in a memory device or memory medium such as a memory included in the control circuit 21.

When it is determined that the received light power level P falls within the appropriate range of "B<P<C" (YES in Operation P22), the control circuit 21 may continue to monitor the received light power level P of the APD 14, while maintaining the VOA loss of the current status of etalon filter 13.

Otherwise, when it is determined that the received light power level P does not fall within the appropriate range of "B<P<C" (NO in Operation P22), the control circuit 21 instructs the temperature adjusting circuit 22 to control the VOA loss of the etalon filter 13.

For example, when the received light power level P is equal to or lower than the lower limit B of the appropriate range, the control circuit 21 instructs the temperature adjusting circuit 22 to decrease the VOA loss of the etalon filter 13. In contrast, when the received light power level P is equal to or higher than the upper limit C of the appropriate range, the control circuit 21 instructs the temperature adjusting circuit 22 to increase the VOA loss of the etalon filter 13.

The temperature adjusting circuit 22 controls the temperature of the etalon filter 13 such that the VOA loss of the etalon filter 13 is decreased or increased, for example, by controlling a current flowing into the thermoelectric medium 135 of the etalon filter 13 according to an instruction from the control circuit 21.

The control circuit 21 and the temperature adjusting circuit 22 control the VOA loss of the etalon filter 13 until the received light power level P of the APD 14 falls within the appropriate range of "B<P<C" (Operation P23).

As described above, in the normal operation of the optical transceiver 1, the VOA loss of the etalon filter 13 is feedback-controlled such that the APD 14 is operated at an appropriate operation point, thereby adaptively optimizing the input light power level P of the APD 14. As a result, it is possible to achieve an improvement in the optical reception characteristics.

(At the Time of Shutdown of Optical Transceiver)

Next, with reference to FIG. 14, descriptions will be made on an example of control of the VOA loss and APD bias at the time of shutdown of the optical transceiver 1 by being powered OFF.

Figure 14:
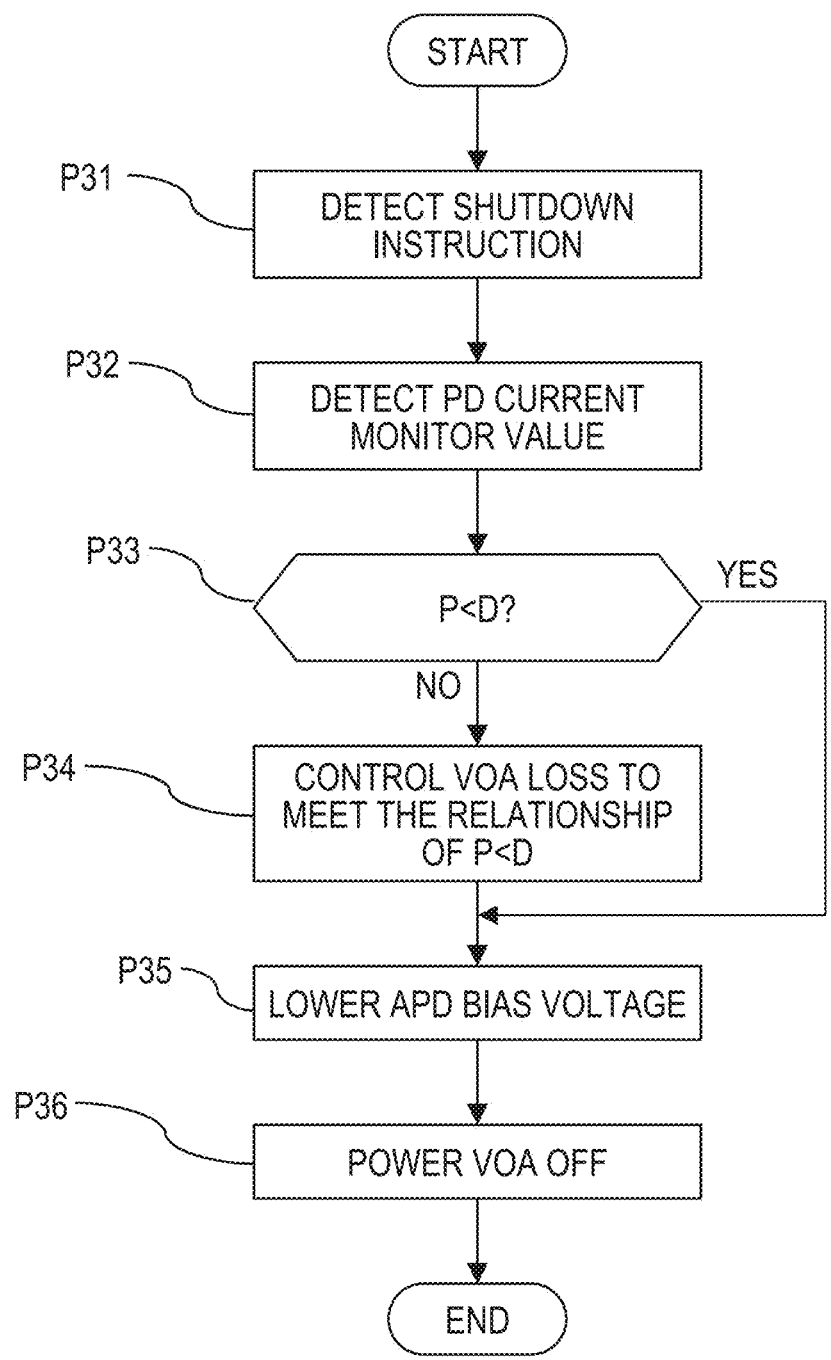
FIG. 14 is a flow chart illustrating an example of a VOA loss control and an APD bias control at the time of a power-OFF and shutdown of the optical transceiver illustrated in FIGS. 1 and 11.

As illustrated in FIG. 14, when the optical transceiver 1 is powered OFF, a shutdown instruction is detected in the control circuit 21 (Operation P31). In response to detecting the shutdown instruction, the control circuit 21 detects a PD current monitor value of the APD 14 (Operation P32).

The control circuit 21 determines whether or not a received light power level P indicated by the detected PD current monitor value is lower than a predetermined threshold D (Operation P33). For example, as illustrated in FIG. 15, the threshold D may be less than the lower limit B of the appropriate range or may be a value corresponding to the maximum value of the VOA loss which can be realized in the etalon filter 13. As in the above-described thresholds A to C, the threshold D may be also stored in a memory device or memory medium such as a memory included in the control circuit 21.

When it is determined that the received light power level P is equal to or higher than the threshold D (NO in Operation P33), the control circuit 21 instructs the temperature adjusting circuit 22 to increase the VOA loss of the etalon filter 13 to, for example, the maximum value (Operation P34).

The temperature adjusting circuit 22 controls the temperature of the etalon filter 13 such that the VOA loss of the etalon filter 13 has the maximum value, for example, by controlling a current flowing into the thermoelectric medium 135 of the etalon filter 13 according to an instruction from the control circuit 21.

Otherwise, when it is determined that the received light power level P is lower than the threshold D (YES in Operation P33), the control circuit 21 may not perform the VOA loss control of the etalon filter 13. However, the control circuit 21 may control the VOA loss to the maximum value in response to detecting the shutdown instruction, irrespective of the PD current monitor value of the APD 14.

With the received light power level P lower than the threshold D, the control circuit 21 may set the APD 14 to the "normal mode" by controlling the bias power supply 15 to lower the bias voltage Vb of the APD 14 (Operation P35).

When the APD 14 is set to the "normal mode," the control circuit 21 may power OFF the temperature adjusting circuit 22 (which may be called a "VOA power stoppage") or may be shutdown by itself (Operation P36).

As described above, at the time of shutdown of the optical transceiver 1, with the VOA loss of the etalon filter 13 controlled to, for example, the maximum value, the bias voltage Vb of the APD 14 is lowered and the VOA power is then stopped.

As a result, at the time of shutdown of the optical transceiver 1, it is possible to prevent light of an unintended excessive power level from being incident into the APD 14.

(Modifications)

An example of controlling the transmission characteristic of the etalon filter 13 through the temperature control (in other words, the current control of the thermoelectric medium 135) has been described in the above embodiment. If there is a need of a high speed response speed rather than the temperature control, a voltage control of a piezoelectric element may be used to control the transmission characteristic of the etalon filter 13.

Figure 16A:
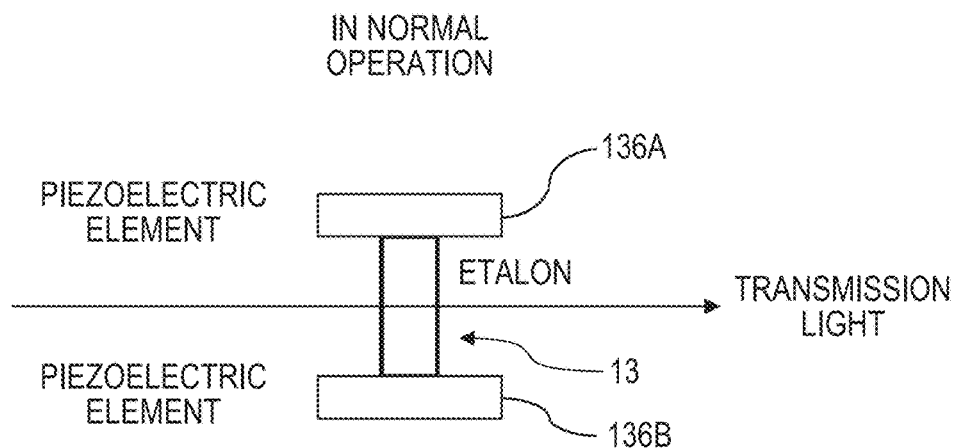
FIGS. 16A and 16B are schematic views for explaining a modified embodiment in which a resonance length of the etalon filter illustrated in FIGS. 1 and 2 is varied by a piezoelectric element.

A piezoelectric element is an example of an element having a property that its shape is changed with application of a voltage to the element. For example, as illustrated in FIGS. 16A and 16B, piezoelectric elements 136A and 136B are respectively attached to two opposing faces of the etalon filter 13 which are in parallel to an optical path passing through the etalon filter 13.

Figure 16B:
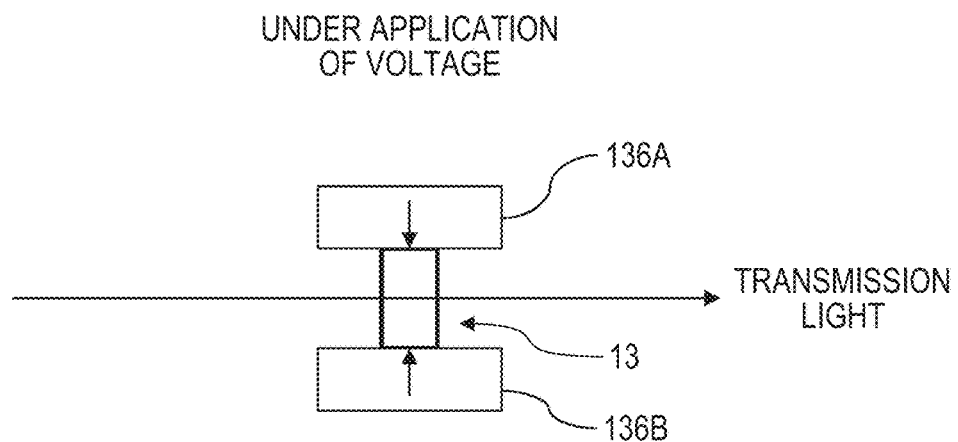

When a voltage is applied across the piezoelectric elements 136A and 136B, the piezoelectric elements 136A and 136B are deformed as schematically illustrated in FIG. 16B and, accordingly, a stress occurring due to the deformation is exerted on the etalon filter 13.

When the etalon filter 13 (or the transparent medium 130) is deformed in response to the stress from the piezoelectric elements 136A and 136B, a distance between the dielectric multi-layered films 131 and 132 is changed and, accordingly, the optical "resonance length" d (see, e.g., FIG. 4) of the etalon filter 13 is changed.

Thus, the deformation in response to the voltage applied across the piezoelectric elements 136A and 136B can be used to vary the transmission characteristic of the etalon filter 13. Since a response speed of the deformation in response to the voltage applied across the piezoelectric elements 136A and 136B can be achieved, for example, in an order of several milliseconds (ms), it is possible to realize a VOA loss control faster than the current control of the thermoelectric medium 135.

Both of the thermoelectric medium 135 and the piezoelectric elements 136A and 136B are the examples of a medium, means, mechanism or structure that varies the transmission characteristic (in other words, the optical "resonance length") of the etalon filter 13.

In addition, the etalon filter 13 may be disposed at an output of an optical amplifier which amplifies the light of a single wavelength (e.g., the reception wavelength λ1) (which may be referred to as a "single-wavelength optical amplifier"). For example, since the etalon filter 13 including the piezoelectric elements 136A and 136B can provide a high response speed as described above, it is possible to control the output light power of the single-wavelength optical amplifier at a high speed.

Therefore, it is possible to realize an Automatic Gain Control (AGC) or an Automatic Level Control (ALC) of the single-wavelength optical amplifier with a sufficient response speed, without relying on any excited light power control.

In addition, since the etalon filter 13 causes and outputs an optical interference by multi-reflection for only a specific wavelength (e.g., λ1), it is possible to remove or suppress an Amplified Spontaneous Emission (ASE) light component which is produced in the single-wavelength optical amplifier.

Therefore, a separate optical filter such as a gain equalizer (GEQ) or the like may not be used to remove or suppress such an ASE light component. Alternatively, performance (or characteristic) required for the GEQ can be alleviated.

According to the above-described embodiments and modifications, it is possible to adjust the power level of light of a desired reception wavelength λ1 by placing the etalon filter 13 having the variable transmission characteristic in front of the PD 14 and controlling the transmission characteristic (VOA loss) of the etalon filter 13.

Figure 18:
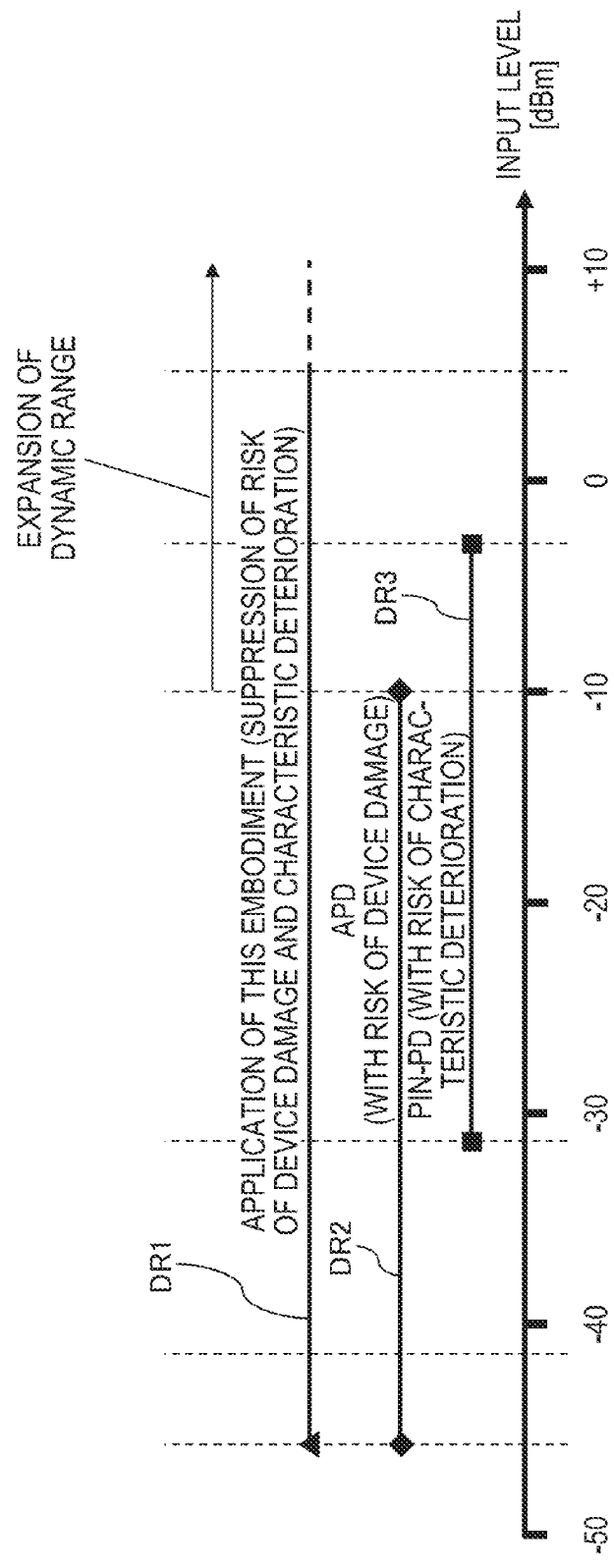
FIG. 18 is a view for explaining an example of effects of one embodiment and a modification.

Therefore, it is possible to adjust the power level of light of the reception wavelength to fall within the operation guarantee range of the PD 14 and expand an input dynamic range of the receiver circuit 23 (or the optical transceiver 1) without relying on the operation guarantee range of the PD 14 (see, e.g., DR1 in FIG. 18).

In addition, as illustrated in FIG. 1, since the etalon filter 13 is disposed in the optical path of the reception wavelength λ1 between the 45 degrees optical filter 12 and the PD 14, the VOA loss control of the reception wavelength has no effect on light of the transmission wavelength λ2.

Therefore, the above-mentioned dynamic range expansion of reception wavelength can be achieved without giving a loss to the output light of the transmission wavelength, i.e., with a transmission light power level being easily maintained at a target value.

In addition, as illustrated in FIG. 5, since the transmittance of the etalon filter 13 can be assumed as 0 [dB] corresponding to the minimum value of the VOA loss in principle, the minimum insertion loss of the etalon filter 13 for the reception wavelength may be assumed as zero (or a negligible value) (see, e.g., DR1 in FIG. 18). In other words, the minimum reception sensitivity of the PD 14 can be prevented from being deteriorated.

Therefore, as illustrated in FIG. 18, it is possible to alleviate or remove the limitation on the upper limit specification of the input dynamic range of the receiver circuit 23 (and further of the optical transceiver 1) without narrowing the lower limit specification of the input dynamic range thereof.

Figure 17:
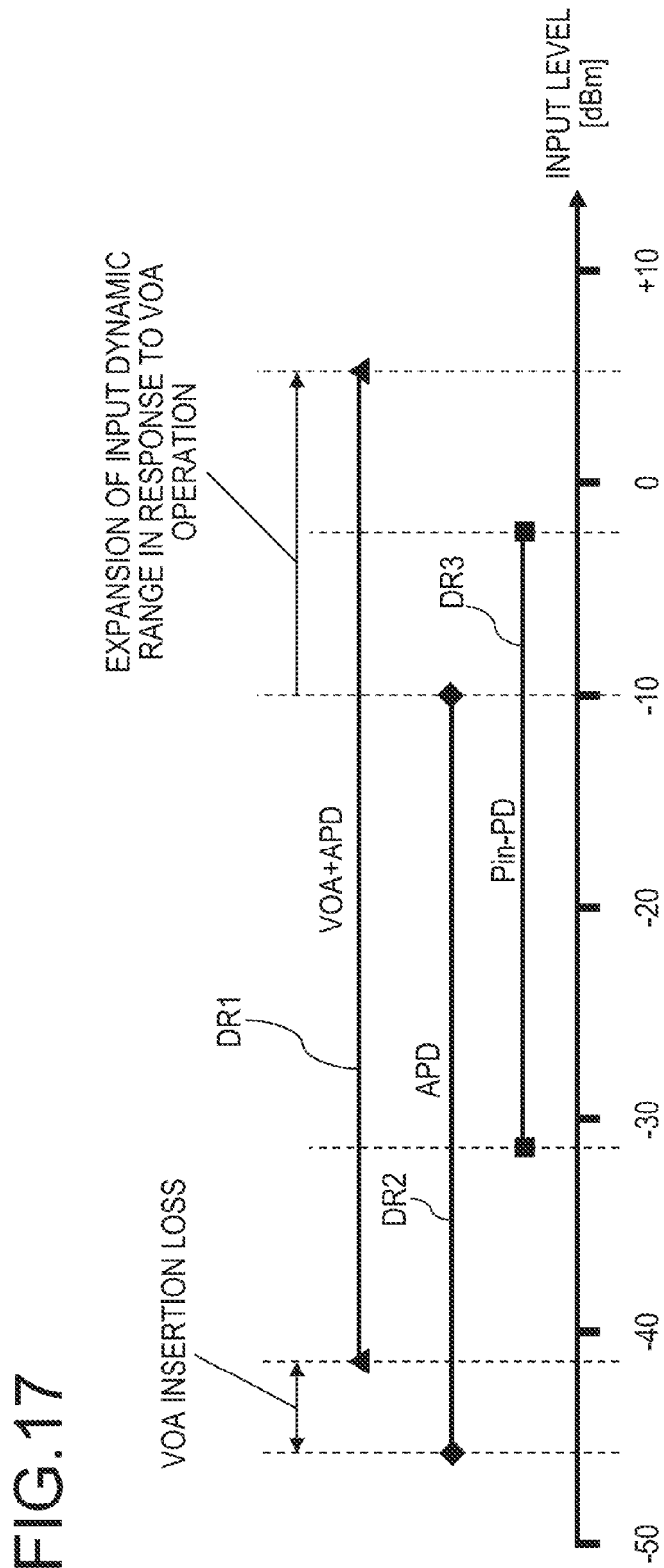
FIG. 17 is a view for explaining an example of effects of an embodiment and a modified embodiment.

In FIGS. 17 and 18, reference numeral DR2 denotes an example of the input dynamic range of the optical transceiver 1 (or the receiver circuit 23) in a case where the APD 14 is placed alone without placing the etalon filter 13 in the reception wavelength optical path of the optical transceiver 1.

In addition, reference numeral DR3 denotes an example of the input dynamic range of the optical transceiver 1 (or the receiver circuit 23) in a case where a (variable or fixed) optical attenuator and a Pin-PD are placed in the reception wavelength optical path of the optical transceiver 1.

As described above, the APD 14 has the ability to detect a weak input light with high sensitivity; however, it has an upper limit in the input light power level (in other words, the APD 14 has a risk of damage). On this account, if the APD 14 is placed alone in the reception wavelength optical path of the optical transceiver 1, the input dynamic range DR2 of the optical transceiver 1 is limited to the operation guarantee range of the APD 14.

In addition, if the optical attenuator and the Pin-PD are placed in the reception wavelength optical path of the optical transceiver 1, the input dynamic range DR3 can be wider than the input dynamic range DR2 in a case where the APD 14 is placed alone; however, its lower limit is limited depending on an insertion loss of the optical attenuator.

In addition, if a variable optical attenuator is separately placed in the reception wavelength optical path of the optical transceiver 1, there is a possibility that the size and power consumption of the optical transceiver 1 are increased. In addition, if a fixed optical attenuator is placed in the reception wavelength optical path of the optical transceiver 1, there is a possibility that the maintenance is complicated because an adjustment of the VOA loss relies strongly on a manual work.

In contrast, with the etalon filter 13 according to the above-described embodiment, since the VOA function can be realized by adjusting the transmission characteristic for the reception wavelength, there is no need of an additional and separate VOA, and there is no possibility that the size of the optical transceiver 1 is increased. In other words, it is possible to make the optical transceiver 1 more compact.

In addition, since the etalon filter 13 intensifies the light of the reception wavelength by an optical interference (optical resonance) and outputs the intensified light to the PD 14, there is no need to place an optical condensing device, such as a lens condensing the light of the reception wavelength, in the reception wavelength optical path. Therefore, it is possible to eliminate an insertion loss of the condensing device.

In addition, the etalon filter 13 can continuously vary the VOA loss by shifting its periodic transmission characteristic in the wavelength direction. Therefore, by setting the period of the transmission characteristic of the etalon filter 13 such that a plurality of transmittance peaks appears within the signal wavelength range, it is possible to support a flexible VOA loss in a broadband signal wavelength range (e.g., about 20 dB).

For example, by using a VOA loss corresponding to the wavelength shift of the transmittance peak closest to any target wavelength within the broadband signal wavelength range, it is possible to achieve a wider VOA loss width with less power. Therefore, it is possible to optimally adjust the power level of light incident into the PD 14 to an appropriate level with less power consumption.

In addition, since the temperature control of the etalon filter 13 with VOA function is limited to the internal space of the optical transceiver 1, power consumption for the temperature control can be easily streamlined, thereby achieving a power saving.

In addition, since the transparent medium 130 of the etalon filter 13 is made of an organic material (e.g., silicon resin) having a greater dependency of refractive index on temperature than quartz, it is possible to obtain a wider variable attenuation width with a less change in temperature. This can result in further streamlining of power consumption.

In addition, since the transmission characteristic of the etalon filter 13 may be feedback-controlled on the basis of the PD current monitor value of the PD 14 such that a loss appropriate for the light of the reception wavelength is undergone, it is possible to achieve an improvement in the reception characteristics with a simpler control circuit 21 that does not require a complicated control.

In addition, since the control of the transmission characteristic of the etalon filter 13 can be realized at a response speed of an order of several ms to 100 ms or so, it is possible to achieve a response speed higher than that obtained when a separate additional VOA is used.

In addition, since the etalon filter 13 can control the VOA loss by the wavelength shift of its periodic transmission characteristic, it is possible to exclude a moving part applied to a VOA using an MEMS mirror or a mechanical VOA. Therefore, the reliability of the optical transceiver 1 can be improved as long as there is no such thing in which the VOA loss control becomes disabled due to, for example, the failure of the moving part.

Comparative Example

Figure 19:
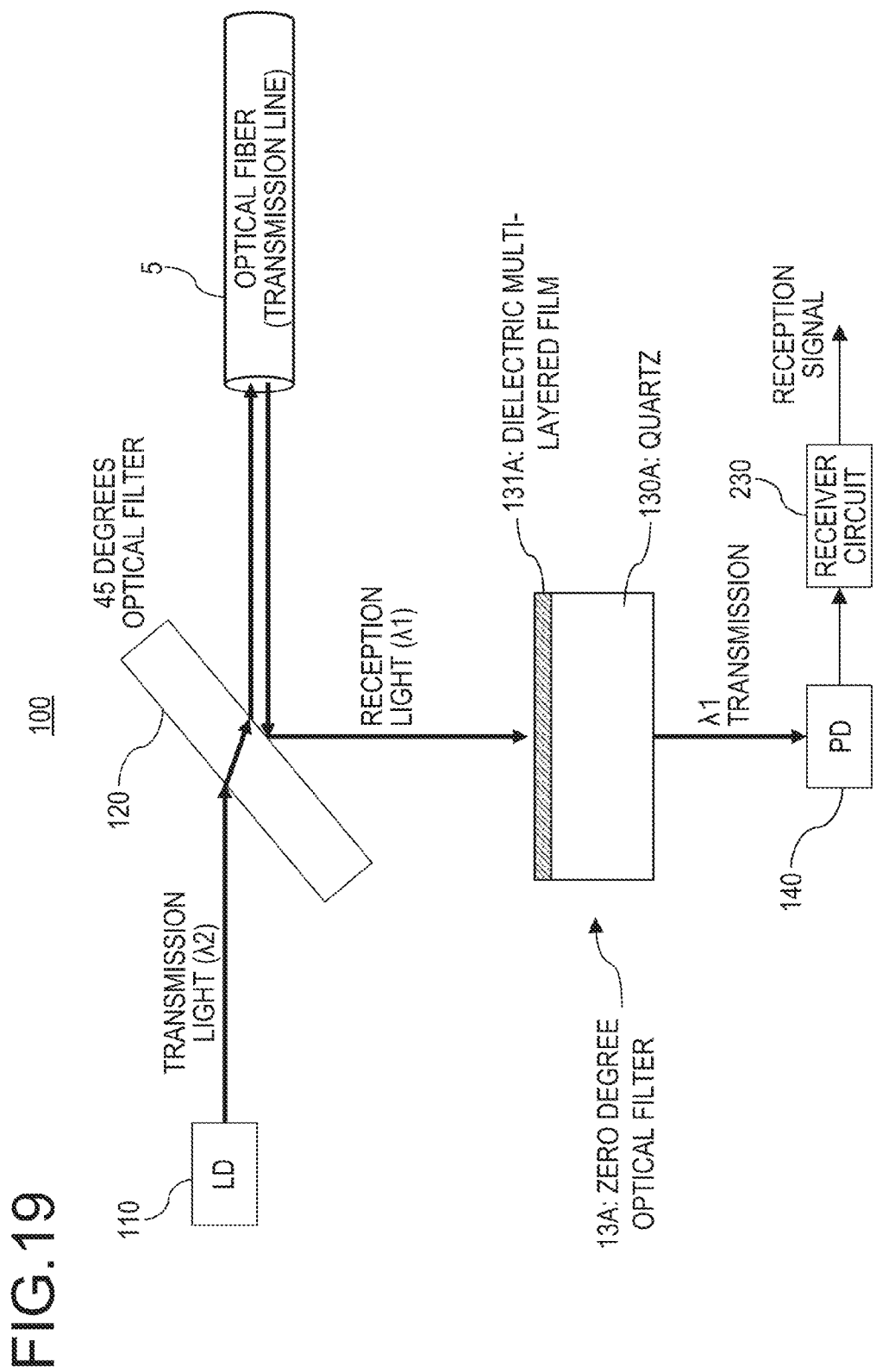
FIG. 19 is a block diagram illustrating the configuration of an optical transceiver according to a comparative example against the embodiment and the modified embodiment.

FIG. 19 is a block diagram illustrating the configuration of an optical transceiver 100 according to a comparative example with respect to the above-described embodiments and modifications. The optical transceiver 100 illustrated in FIG. 19 may include a light source 110, a 45 degrees optical filter 120, a photodetector (or photodiode) (PD) 140 and a receiver circuit 230, as in the optical transceiver 1 illustrated in FIG. 1.

However, the optical transceiver 100 according to the comparative example has a difference from the optical transceiver 1 in that, instead of the zero degree optical filter (the etalon filter with VOA function) 13 illustrated in FIG. 1, a zero degree optical filter 13A including a transparent medium made of quartz 130A is placed in a reception wavelength optical path between the 45 degrees optical filter 120 and the PD 140.

Figure 20:
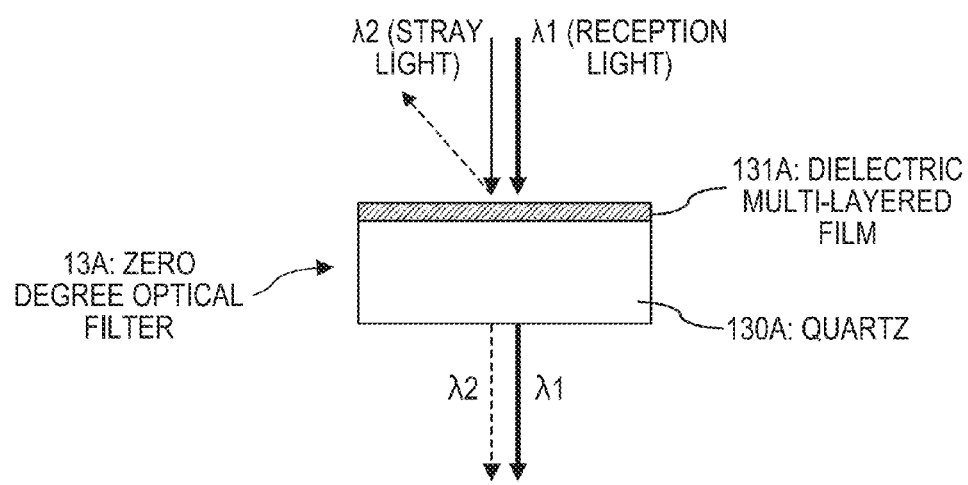
FIG. 20 is a schematic side view illustrating the configuration of a zero-degree incident optical filter in the comparative example illustrated in FIG. 19.
Figure 21A:
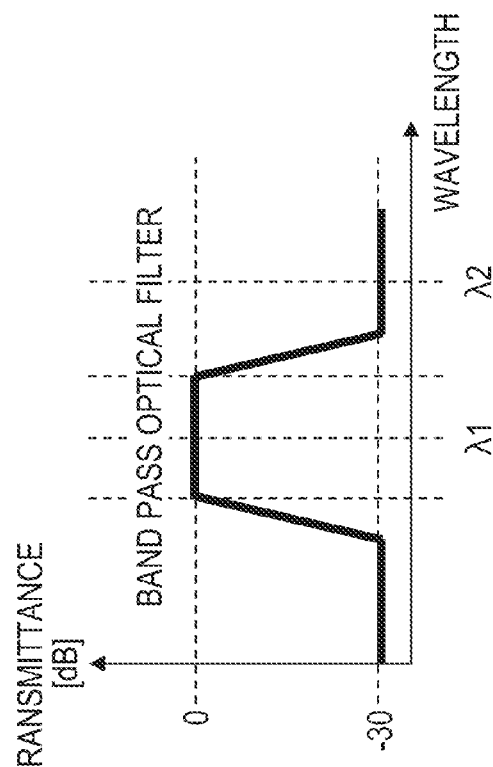
FIG. 21A is a view illustrating an example of the characteristic of the reflectivity of the zero-degree incident optical filter with respect to a wavelength in the comparative example illustrated in FIG. 19.
Figure 21B:
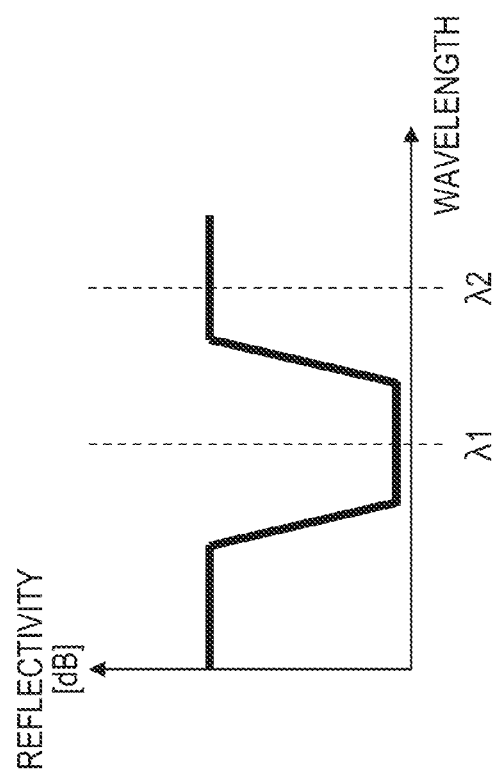
FIG. 21B is a view illustrating an example of the characteristic of the transmittance of the zero-degree incident optical filter with respect to a wavelength in the comparative example illustrated in FIG. 19.

The zero degree optical filter 13A includes a dielectric multi-layered film 131A formed on a light incidence surface of the quartz 130A. For example, as illustrated in FIGS. 20, 21A and 21B, the dielectric multi-layered film 131A has the reflection (transmission) characteristic of transmitting light of a desired reception wavelength $\lambda 1$ and reflecting light of an undesired reception wavelength (transmission wavelength) $\lambda 2$. In other words, this characteristic is the bandpass filter (BPF) characteristic of transmitting the wavelength $\lambda 1$.

The above-structured zero degree optical filter 13A can be used to cut the light of the transmission wavelength $\lambda 2$, which is stray light, and input only the light of the desired reception wavelength $\lambda 1$ to the PD 140. However, the zero degree optical filter 13A can only transmit the light of the wavelength $\lambda 2$ but cannot vary the transmission light power. On this account, an input dynamic range of the optical transceiver 100 is limited to an operation guarantee range of the PD 140.

In order to expand the input dynamic range of the optical transceiver 100 and make a loss of the light of the wavelength $\lambda 2$ variable, a separate VOA may be additionally interposed between the zero degree optical filter 13A and the PD 140. However, the added separate VOA may increase the size of the optical transceiver 100.

For example, the current status of small VOA is a module having the minimum insertion loss of about 2 dB and the size of 10×30 mm to 10×40 mm or so; however, in some cases, it cannot be incorporated in the optical transceiver 100 if the size of the optical transceiver 100 has been already determined by a standard or the like.

Therefore, as illustrated in FIG. 22, it is contemplated that a VOA 300 is disposed in the outside of the optical transceiver 100 (e.g., interposed between the 45 degrees optical filter 120 and the optical fiber 5) in order to expand the input dynamic range of the optical transceiver 100.

However, the VOA 300 interposed between the 45 degrees optical filter 120 and the optical fiber 5 unnecessarily attenuates not only the light of the reception wavelength $\lambda 1$ but also the light of the transmission wavelength $\lambda 2$. On this account, in order to maintain the power of output light of the transmission wavelength $\lambda 2$ at a target value, the output light power of the light source 110 must be increased in response to an amount of attenuation in the VOA 300. This results in an increase in power consumption of the optical transceiver 100.

As illustrated in FIG. 1, only by replacing the zero degree optical filter 13A illustrated in FIG. 19 with the etalon filter 13 equipped with the VOA function, it is possible to expand the input dynamic range of the optical transceiver 1 without an increase in the size, costs, insertion loss, power consumption and so on of the optical transceiver 1.

Therefore, the above-described various effects can be exhibited only by applying the etalon filter 13 equipped with the VOA function of one kind to a receiving part of the optical transceiver 1 including no particular optical level adjusting function in an inexpensive optical access network.

For example, it is possible to realize an inexpensive optical transceiver 1 with the minimum size impact and a negligible insertion loss to a reception wavelength optical path, which is capable of supporting a broadband reception wavelength and expanding an input dynamic range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A variable optical attenuator comprising:
a transparent medium configured to transmit light;
a first reflective film formed on a light incidence surface of the transparent medium;
a second reflective film formed on a light emission surface of the transparent medium; and
a resonance length variable medium configured to vary an optical resonance length between the first reflective film and the second reflective film, wherein
the first reflective film has a first reflectivity at which light of a first wavelength and light of a second wavelength are partially transmitted through the first reflective film, and
the second reflective film has a second reflectivity lower than the first reflectivity for the light of the first wavelength and a third reflectivity lower than the second reflectivity for the light of the second wavelength,
the variable optical attenuator thereby configured so that, when the light of the first wavelength and the light of the second wavelength are partially transmitted through the first reflective film, a standing wave is generated between the first and second reflective films for the light at the first wavelength, and a standing wave is not generated, or is suppressed, between the first and second reflective films for the light at the second wavelength.

2. The variable optical attenuator according to claim 1, wherein the first reflective film has the first reflectivity for both of the light of the first wavelength and the light of the second wavelength.

3. The variable optical attenuator according to claim 1, wherein the transparent medium is made of an organic material.

4. The variable optical attenuator according to claim 3, wherein the organic material is silicon resin.

5. The variable optical attenuator according to claim 1, wherein the resonance length variable medium is a thermoelectric medium, and
wherein the resonance length is varied by changing a refractive index of the transparent medium by varying a temperature of the transparent medium via the thermoelectric medium.

6. The variable optical attenuator according to claim 1, wherein the resonance length variable medium is a piezoelectric element, and
wherein the resonance length is varied by changing a distance between the first reflective film and the second reflective film by applying a stress on the transparent medium, the stress occurring due to a deformation of the piezoelectric element in response to a voltage applied across the piezoelectric element.

7. The variable optical attenuator according to claim 1, wherein the first to third reflectivities are set such that a plurality of periodic transmittance peaks for the light of the first wavelength appears in a wavelength range in which an optical signal to be transmitted with the first wavelength is set.

8. An optical module comprising:
a light source;
a light receiving element;
an optical filter configured to output light of a first wavelength, which is received from an optical transmission line, to the light receiving element and output light of a second wavelength, which is output from the light source, to the optical transmission line;
a variable optical attenuator configured to vary an amount of attenuation of the light of the first wavelength to be input from the optical filter and to be output to the light receiving element, the variable optical attenuator including:
a transparent medium configured to transmit light,
a first reflective film formed on a light incidence surface of the transparent medium,
a second reflective film formed on a light emission surface of the transparent medium, and
a resonance length variable medium configured to vary an optical resonance length between the first reflective film and the second reflective film, wherein
the first reflective film has a first reflectivity at which the light of the first wavelength and the light of the second wavelength are partially transmitted through the first reflective film, and
the second reflective film has a second reflectivity lower than the first reflectivity for the light of the first wavelength and a third reflectivity lower than the second reflectivity for the light of the second wavelength,
the variable optical attenuator thereby configured so that, when the light of the first wavelength and the light of the second wavelength are partially transmitted through the first reflective film, a standing wave is generated between the first and second reflective films for the light at the first wavelength, and a standing wave is not generated, or is suppressed, between the first and second reflective films for the light at the second wavelength; and
a controller configured to control the amount of attenuation of the variable optical attenuator by controlling the resonance length variable medium.

9. The optical module according to claim 8, wherein the controller monitors a received light power level of the light receiving element and controls the amount of attenuation such that the received light power level falls within a light receivable range of the light receiving element.

10. The optical module according to claim 9, wherein the controller controls a bias voltage for adjusting a multiplication factor of the light receiving element so as to be lower than the bias voltage in a normal operation of the optical module when the optical module is starting, and controls the bias voltage so as to be equal to the bias voltage in the normal operation when the received light power level falls within the light receivable range.

11. A variable optical attenuator comprising:
a transparent medium configured to transmit light;
a first reflective film formed on a light incidence surface of the transparent medium;
a second reflective film formed on a light emission surface of the transparent medium; and means for varying an optical resonance length between the first reflective film and the second reflective film, wherein the first reflective film has a first reflectivity at which light of a first wavelength and light of a second wavelength are partially transmitted through the first reflective film, and the second reflective film has a second reflectivity lower than the first reflectivity for the light of the first wavelength and a third reflectivity lower than the second reflectivity for the light of the second wavelength, the variable optical attenuator thereby configured so that, when the light of the first wavelength and the light of the second wavelength are partially transmitted through the first reflective film, a standing wave is generated between the first and second reflective films for the light at the first wavelength, and a standing wave is not generated, or is suppressed, between the first and second reflective films for the light at the second wavelength.

\* \* \* \* \*